(12) United States Patent
Terada et al.

(10) Patent No.: US 10,411,467 B2
(45) Date of Patent: Sep. 10, 2019

(54) INFORMATION PRESENTATION APPARATUS, INFORMATION PRESENTATION METHOD, AND RECORDING MEDIUM STORING COMPUTER PROGRAM

(71) Applicant: Panasonic Intellectual Property Corporation of America, Torrance, CA (US)

(72) Inventors: Yoshihisa Terada, Osaka (JP); Fumiaki Suzuki, Osaka (JP); Hideyuki Yoshida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/720,660

(22) Filed: May 22, 2015

(65) Prior Publication Data

US 2015/0347076 A1    Dec. 3, 2015

(30) Foreign Application Priority Data

May 28, 2014    (JP) ................................ 2014-110338

(51) Int. Cl.
| | | |
|---|---|---|
| *H02J 3/00* | (2006.01) | |
| *G09G 5/00* | (2006.01) | |
| *G06F 1/32* | (2019.01) | |
| *G06Q 50/06* | (2012.01) | |

(52) U.S. Cl.
CPC ................ *H02J 3/00* (2013.01); *G06Q 50/06* (2013.01); *G09G 5/00* (2013.01); *G09G 2340/14* (2013.01)

(58) Field of Classification Search
CPC . G06F 3/01; G06F 3/033; G06F 3/048; G06F 3/0481; G06F 3/04812; G06F 3/04817; G06F 3/04842; G06F 3/0482; G06F 3/0488

See application file for complete search history.

(56) References Cited

U.S. PATENT DOCUMENTS

| | | | |
|---|---|---|---|
| 6,694,087 B1 * | 2/2004 | Weaver ................ | G11B 27/034 386/282 |
| 8,893,032 B2 * | 11/2014 | Bruck .................. | F24F 11/0086 715/771 |
| 2004/0117330 A1 * | 6/2004 | Ehlers .................. | F24F 11/0012 705/412 |

(Continued)

FOREIGN PATENT DOCUMENTS

| | | |
|---|---|---|
| JP | 2012-018462 | 1/2012 |
| WO | 2011/024366 A1 | 3/2011 |
| WO | 2014/013533 A1 | 1/2014 |

*Primary Examiner* — William Lu
(74) *Attorney, Agent, or Firm* — Greenblum & Bernstein, P.L.C.

(57) ABSTRACT

An information presentation apparatus includes: a storage storing first image information for use in screen display; and an information processor reading the first image information from the storage and executing first screen display based on the first image information. After executing the first screen display, the information processor generates second image information for use in screen display based on user's operation, stores the generated second image information in the storage, and executes second screen display based on the second image information read from the storage.

17 Claims, 20 Drawing Sheets

(56) References Cited

U.S. PATENT DOCUMENTS

| | | | |
|---|---|---|---|
| 2004/0153170 A1* | 8/2004 | Santacatterina | H02J 3/14 700/1 |
| 2009/0207753 A1* | 8/2009 | Bieganski | G01D 4/004 370/254 |
| 2010/0106575 A1* | 4/2010 | Bixby | G06Q 30/018 705/14.11 |
| 2011/0137826 A1* | 6/2011 | West | G06Q 30/04 705/412 |
| 2011/0173542 A1* | 7/2011 | Imes | H04L 67/42 715/735 |
| 2011/0264286 A1* | 10/2011 | Park | G06Q 10/00 700/286 |
| 2012/0150463 A1* | 6/2012 | Ozawa | G05B 15/02 702/62 |
| 2012/0296488 A1* | 11/2012 | Dharwada | H02J 13/001 700/296 |
| 2013/0073997 A1* | 3/2013 | Brian | G06F 3/048 715/772 |
| 2013/0079937 A1* | 3/2013 | Aisu | H02J 13/0086 700/286 |
| 2013/0144451 A1* | 6/2013 | Kumar | G05B 13/02 700/291 |
| 2014/0214222 A1* | 7/2014 | Rouse | G06Q 50/06 700/291 |
| 2014/0277788 A1* | 9/2014 | Forbes, Jr. | G05F 1/66 700/286 |
| 2014/0277795 A1* | 9/2014 | Matsuoka | G06Q 30/0202 700/291 |

\* cited by examiner

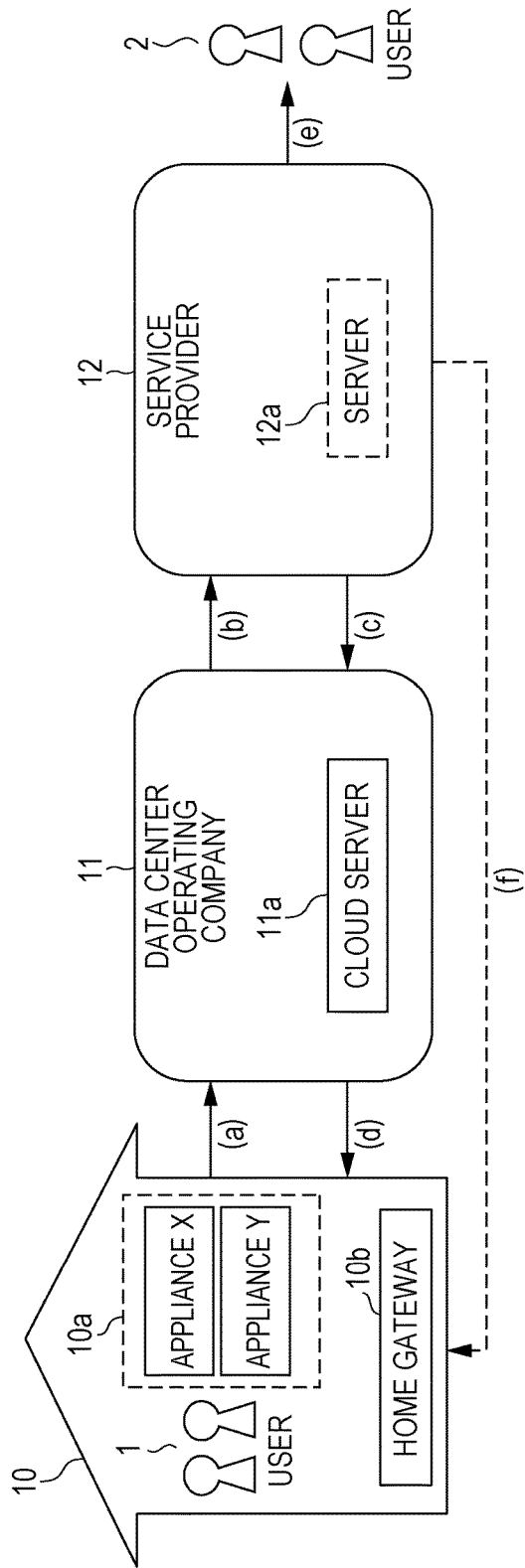
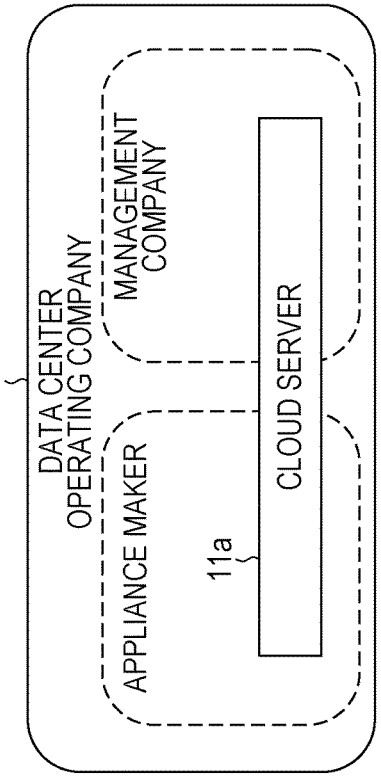
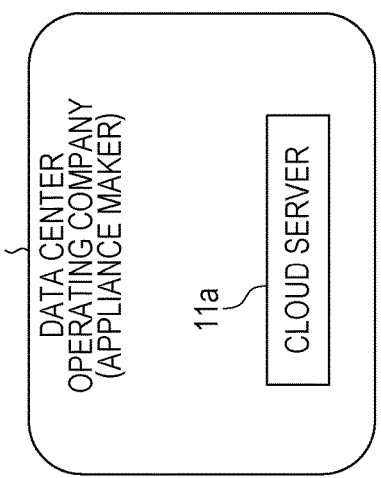

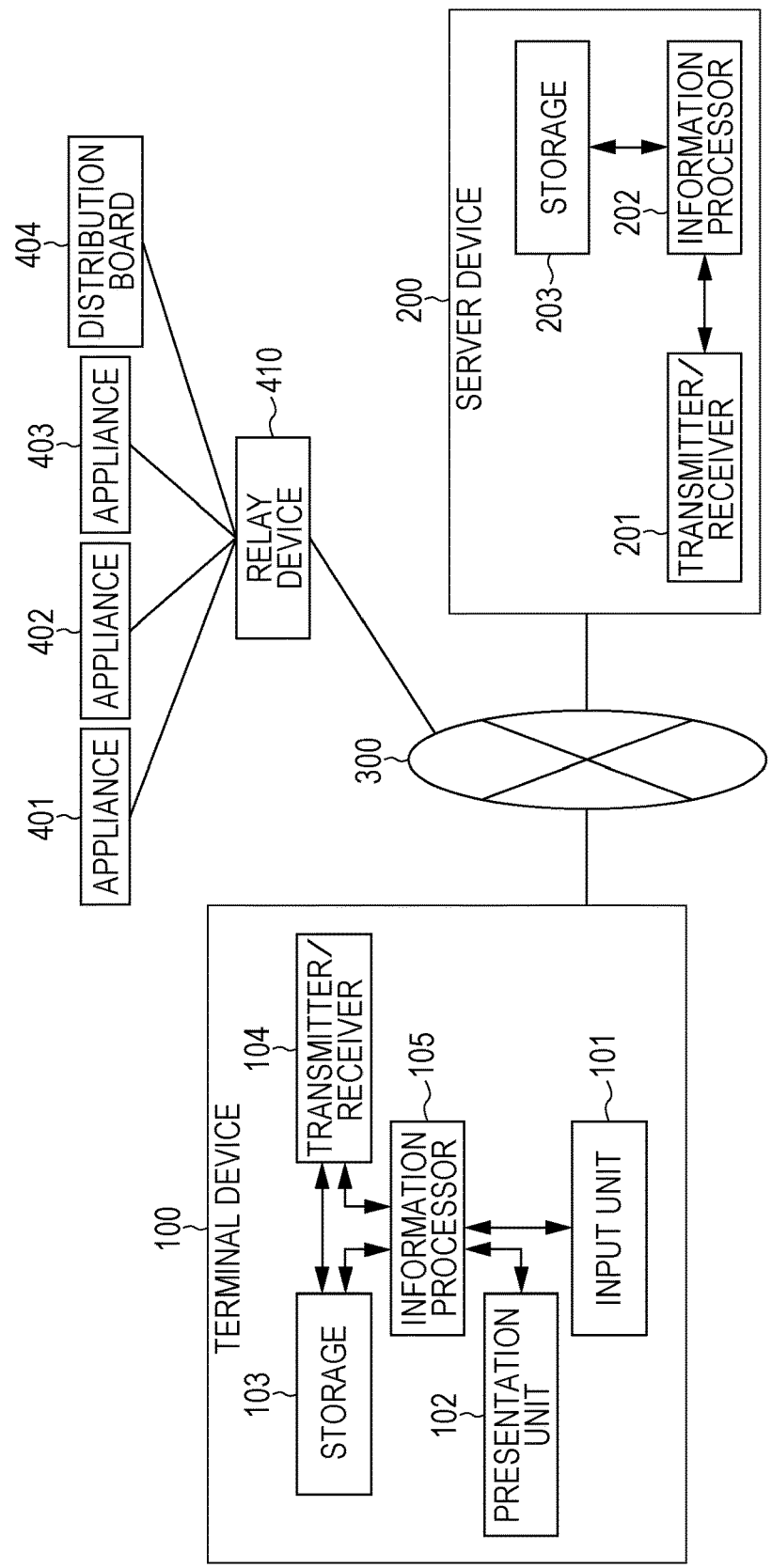

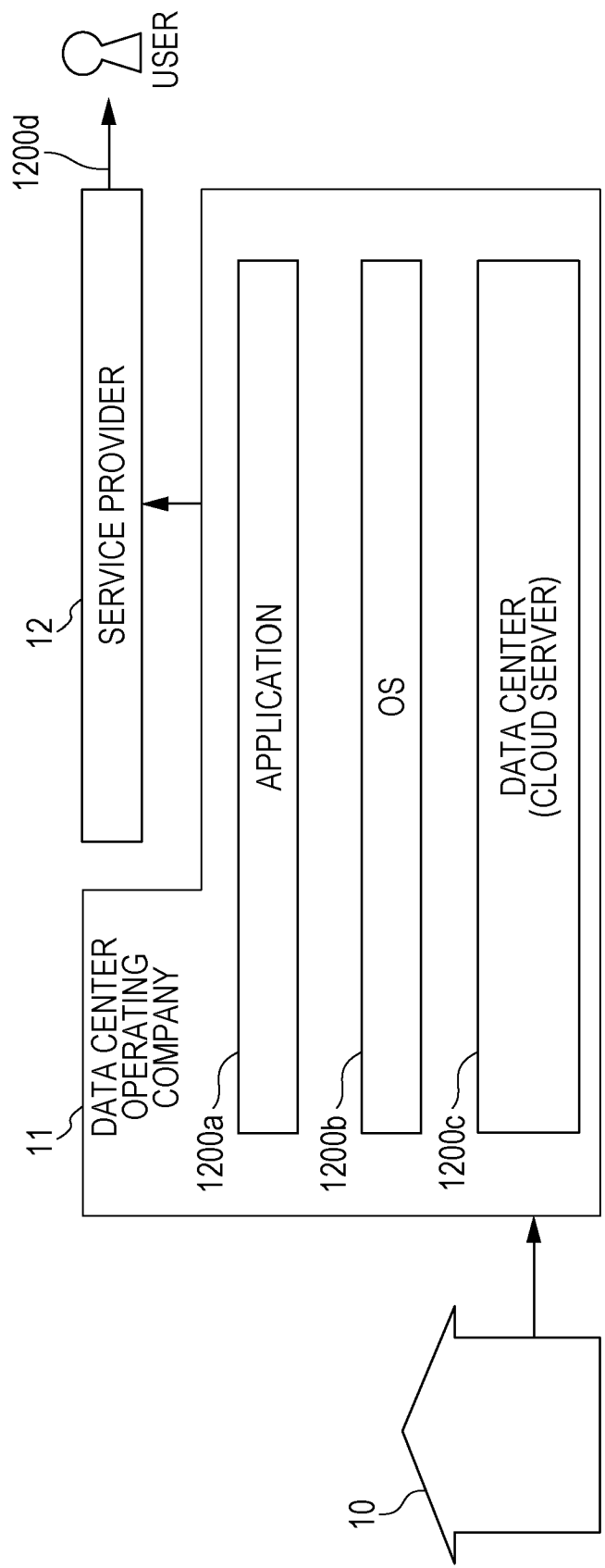

INFORMATION PRESENTATION APPARATUS, INFORMATION PRESENTATION METHOD, AND RECORDING MEDIUM STORING COMPUTER PROGRAM

BACKGROUND

1. Technical Field

The disclosure relates to an information presentation apparatus, an information presentation method, and a recording medium storing a computer program, where the information presentation apparatus and method and the recording medium storing the computer program provide information on electricity consumption of electrical appliances to a user.

2. Description of the Related Art

Japanese Unexamined Patent Application Publication No. 2012-18462, for example, discloses a system to provide a user with image information indicating a time series of electricity consumption of each electrical appliance used in the home (hereinafter, referred to as a conventional technique). According to this conventional technique, the user can know the time series of electricity consumption of electrical appliances.

SUMMARY

In one general aspect, the techniques disclosed here feature an information presentation apparatus, including:

a storage which stores first image information for use in screen display; and an information processor which reads the first image information from the storage and executes first screen display based on the first image information, in which after executing the first screen display, the information processor generates second image information for use in screen display based on an operation by a user, stores the generated second image information in the storage, and executes second screen display based on the second image information read from the storage. The execution of the first screen display includes a process of displaying a first total electricity image and a first operating period image together on a display unit, the first total electricity image representing a time series of total electricity consumption of appliances installed in a predetermined area for a predetermined time, the first operating period image representing a time series of an operating period of each of the appliances for the predetermined time, and the execution of the second screen display includes a process of displaying a second total electricity image and a second operating period image together on the display unit, the second total electricity image representing a time series of the total electricity consumption updated based on a change of the operating period of at least one of the appliances specified by the user, the second operating period image representing a time series of the operating period of each of the appliances updated based on the change of the operating period specified by the user.

According to the disclosure, the user can know a change in the total electricity consumption when the user changes a desired operating period of a desired electrical appliance.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a diagram outlining an information presentation system according to an embodiment;

FIG. 1B is a diagram outlining the information presentation system according to the embodiment;

FIG. 1C is a diagram outlining the information presentation system according to the embodiment;

FIG. 2 is a block diagram illustrating an example of the configuration of the information presentation system according to the embodiment;

FIG. 25 is a diagram illustrating service type 4 (SaaS type).

DETAILED DESCRIPTION

Figure 3:
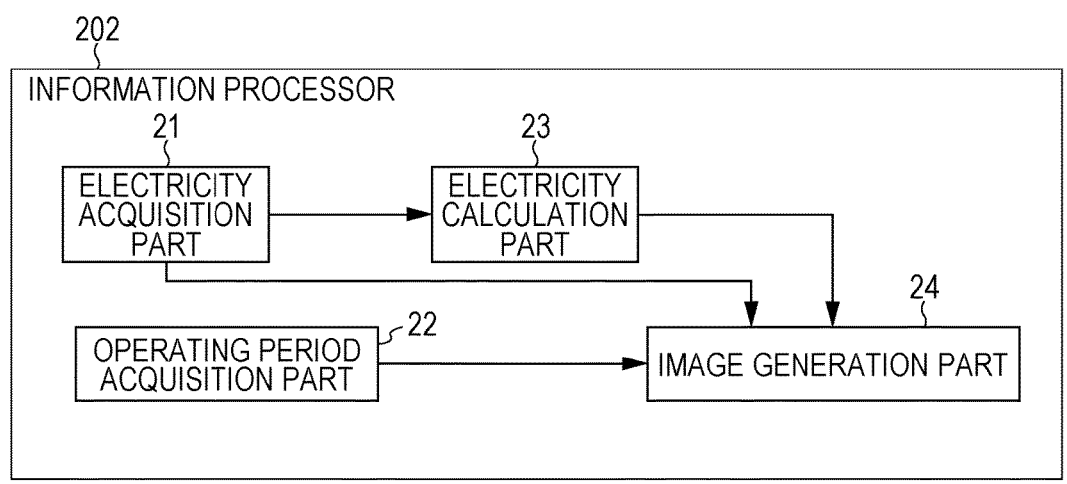
FIG. 3 is a block diagram illustrating an example of the configuration of an information processor according to the embodiment.

According to the conventional technique, the user cannot know a change in the total electricity consumption when the user changes a desired operating period of a desired electrical appliance.

One non-limiting and exemplary embodiment provides an information presentation apparatus, an information presentation method, and a recording medium storing a computer program, where the information presentation apparatus and method and the recording medium storing the computer program allow a user to know a change in the total electricity consumption when the user changes a desired operating period of a desired electrical appliance.

An information presentation apparatus according to an aspect of the disclosure includes: a storage which stores first image information for use in screen display; and an information processor which reads the first image information from the storage and executes first screen display based on the first image information, in which after executing the first screen display, the information processor generates second image information for use in screen display based on an operation by a user, stores the generated second image information in the storage, and executes second screen display based on the second image information read from the storage, the execution of the first screen display includes a process of displaying a first total electricity image and a first operating period image together on a display unit, the first total electricity image representing a time series of total electricity consumption of appliances installed in a predetermined area for a predetermined time, the first operating period image representing a time series of an operating period of each of the appliances for the predetermined time, and the execution of the second screen display includes a process of displaying a second total electricity image and a second operating period image together on the display unit, the second total electricity image representing a time series of the total electricity consumption updated based on a change of the operating period of at least one of the appliances specified by the user, the second operating period image representing a time series of the operating period of each of the appliances updated based on the change of the operating period.

The information presentation apparatus may further include a transmitter which transmits the first image information and the second image information via a network to a terminal device provided with the display unit. The information presentation apparatus causes the terminal device to execute the first screen display based on the transmitted first image information and transmits the second image information to the terminal device to cause the terminal device to execute the second screen display based on the transmitted second image information.

The information presentation apparatus may further include a receiver which receives information based on an operation performed by the user on a touch panel included in the terminal device.

The information presentation apparatus may further include: a generator which generates information for the first total electricity image based on total electricity information indicating the time series of the total electricity consumption of the appliances for the predetermined time and generates information for the first operating period image based on operating period information indicating the time series of the operating period of each of the appliances for the predetermined time; and a calculator which, when a change of the operating period is specified by an operation performed by the user on the terminal device which is connected to the information presentation apparatus via a network, updates the total electricity information based on change information indicating the specified change and individual electricity information indicating a time series of electricity consumption of each of the appliances for the predetermined time. The generator generates information for the second total electricity image based on the updated total electricity information and generates information for the second operating period image based on the change information and the operating period information. The information processor generates the first image information including the generated information for the first total electricity image and the generated information for the first operating period image, and stores the generated first image information in the storage. Moreover, the information processor generates the second image information including the generated information for the second total electricity image and the generated information for the second operating period image, and stores the generated second image information in the storage.

Moreover, when a change of an operating period of a first appliance is specified by an operation performed by the user on the terminal device, the calculator may determine an operating period of a second appliance based on the operating period of the first appliance, the second appliance previously registered as an appliance associated with the first appliance, and update the total electricity consumption based on information of the operating period of the first appliance, information of the operating period of the second appliance, the individual electricity information, and the total electricity information. The generator may generate information for the second total electricity image based on the updated total electricity information and generate information for the second operating period image based on the information of the operating period of the first appliance, the information of the operating period of the second appliance, and the operating period information.

Furthermore, when an action of the user and an period of the action of the user are specified by an operation performed by the user on the terminal device, the calculator may determine an operating period of a third appliance, which is previously registered as an appliance associated with the action of the user, based on the period of the action, and updates the total electricity consumption based on information of the operating period of the third appliance, the individual electricity information, and the total electricity information. The generator generates information for the second total electricity image based on the updated total electricity information and generates information for the second operating period image based on the information of the operating period of the third appliance and the operating period information.

Still furthermore, the generator may generate the information for the first operating period image such that a predetermined image in the first operating period image is displayed in a different style from the other images in the first operating period image based on at least one kind of information among information on magnitude of the electricity consumption of the appliances, information on operating modes of the appliances, information on an appliance previously registered as one to be preferentially turned off, and information on a previously registered standard or recommended operating period of each appliance.

Still furthermore, the first screen display includes a process of displaying a candidate image which can be specified by the user's operation on the display unit of the terminal device, and the candidate image is at least one of an image representing a previously-registered standard operating period of each appliance and a previously-registered operating period recommended for the appliance. The calculator updates the total electricity consumption based on information of the operating period of the candidate image selected by an operation performed by the user on the terminal device, the change information, the individual electricity information, and the total electricity information. The generator generates information for the second total electricity image based on the updated total electricity information and generates information for the second operating period image based on the operating period of the candidate image selected by an operation performed by the user on the terminal device, the change information, and the operating period information.

Still furthermore, when an operation to change a value of the total electricity consumption at a desired time in the first total electricity image to a desired value is performed by the user on the terminal device, the calculator may update the individual electricity information and the total electricity information so that the total electricity consumption at the desired time becomes the desired value. The generator generates the information for the second total electricity image based on the updated total electricity information and generates the information for the second total electricity image based on the updated individual electricity information and the operating period information.

Still furthermore, the storage may include a memory, and the information processor may include a processing circuit.

An information presentation method according to an aspect of the disclosure includes the steps of: storing first image information for use in screen display in a storage; reading the first image information from the storage to execute first screen display based on the first image information; after executing the first screen display, generating second image information for use in screen display based on an operation by a user; storing the generated second image information in the storage; and executing second screen display based on the second image information read from the storage. The execution of the first screen display includes a process of displaying a first total electricity image and a first operating period image together on a display unit of a terminal device, the first total electricity image representing a time series of total electricity consumption of appliances installed in a predetermined area for a predetermined time, the first operating period image representing a time series of an operating period of each of the appliances for the predetermined time. The execution of the second screen display includes a process of displaying a second total electricity image and a second operating period image together on the display unit, the second total electricity image representing a time series of the total electricity consumption updated based on a change of the operating period of at least one of the appliances specified by an operation by the user, the second operating period image representing a time series of the operating period of each of the appliances updated based on the change of the operating period.

A recording medium according to an aspect of the disclosure is a non-transitory computer-readable recording medium storing a computer program, the computer program causing a computer to: store first image information for use in screen display in a storage; read the first image information from the storage to execute first screen display based on the first image information; generate second image information for use in screen display based on an operation by a user after executing the first screen display; store the generated second image information in the storage; and execute second screen display based on the second image information read from the storage. The execution of the first screen display includes a process of displaying a first total electricity image and a first operating period image together on a display unit of a terminal device, the first total electricity image representing a time series of total electricity consumption of appliances installed in a predetermined area for a predetermined time, the first operating period image representing a time series of an operating period of each of the appliances for the predetermined time, and the execution of the second screen display includes a process of displaying a second total electricity image and a second operating period image together on the display unit, the second total electricity image representing a time series of the total electricity consumption updated based on a change of the operating period of at least one of the appliances specified by an operation by the user, the second operating period image representing a time series of the operating period of each of the appliances updated based on the change of the operating period.

An information presentation apparatus according to an aspect of the disclosure includes: a generator which, based on information acquired from appliances installed in a predetermined area generates information for a first total electricity image representing a time series of total electricity consumption of the appliances for a predetermined time and information for a first operating period image representing a time series of an operating period of each of the appliances for the predetermined time; and a calculator which, when a change of a desired operating period of a desired one of the appliances is specified by an operation of a user after the first total electricity image and the first operating period image are displayed on a display unit, updates the total electricity consumption based on change information indicating the specified change and individual power information indicating a time series of electricity consumption of each of the appliances for the predetermined time. The generator generates information for a second total electricity image representing a time series of the updated total electricity consumption, and generates information for a second operating period image in which the specified change of the operating period is reflected in the first operating period image.

At least one of the calculator and the generator includes a processing circuit.

An information presentation method according to an aspect of the disclosure includes the steps of: based on first image information read from a predetermined storage, executing first screen display to display a first total electricity image and a first operating period image together on a display unit, the first total electricity image representing a time series of total electricity consumption of appliances installed in a predetermined area for a predetermined time, the first operating period image representing a time series of the operating period of each of the appliances for the predetermined time; reading from a predetermined storage, second image information generated based on an operation performed by a user after the execution of the first image display; and executing second screen display to display a second total electricity image and a second operating period image together on the display unit based on the second image information, the second total electricity image representing a time series of the total electricity consumption updated based on a change of the operating period of at least one of the appliances specified by the operation of the user, the second operating period image representing a time series of the operating period of each of the appliances updated based on the change of the operating period.

A recording medium according to an aspect of the disclosure is a non-transitory computer-readable recording medium storing a computer program, the computer program causing a computer to: based on first image information read from a predetermined storage, execute first screen display to display a first total electricity image and a first operating period image together on a display unit, the first total electricity image representing a time series of total electricity consumption of appliances installed in a predetermined area for a predetermined time, the first operating period image representing a time series of the operating period of each of the appliances for the predetermined time; read from a predetermined storage, second image information generated based on an operation performed by a user after the execution of the first image display; and execute second screen display to display a second total electricity image and a second operating period image together on the display unit based on the second image information, the second total electricity image representing a time series of the total electricity consumption updated based on a change of the operating period of at least one of the appliances specified by the operation of the user, the second operating period image representing a time series of the operating period of each of the appliances updated based on the change of the operating period.

Hereinafter, a description is given of an embodiment of the disclosure in detail with reference to the drawings.

<Overview of Provided Service>

First, a description is given of the perspective of provided services according to the embodiment using FIGS. 1A to 1C. FIGS. 1A to 1C are diagrams outlining an information presentation system that provides the services in the embodiment. FIG. 1A illustrates the overview of the information presentation system in the embodiment.

A group 10 indicates a company, an association, a family, or the like and may be of any scale. The group 10 includes plural appliances 10a (appliances X and Y, for example) and a home gateway 10b. The group 10 includes a user 1 who uses the plural appliances 10a. The plural appliances 10a include a terminal device 100 described later, appliances 401 to 403, and a distribution board 404 (see FIG. 2), for example. The home gateway 10b is a relay device 410 described later (see FIG. 2), for example.

The plural appliances 10a are accessible to the Internet. The plural appliances 10a need to be accessible to the Internet through the home gateway 10b even if not accessible to the Internet for themselves.

A data center operating company 11 includes a cloud server 11a. The cloud server 11a is a virtualized server which cooperates with various appliances via the Internet. The data center operating company 11 performs data management, cloud server 11a management, operation of the data center performing the management, and the like. The services performed by the data center operating company 11 are described later in detail using FIGS. 22 to 25.

Herein, the data center operating company 11 is not limited to a company which performs only data management, cloud server 11a management, and operation of the data center. If an appliance maker which develops and manufactures one of the plural appliances 10a performs the data management, cloud server 11a management, and the like together with the development and manufacturing, for example, the appliance maker corresponds to the data center operating company 11 (see FIG. 1B).

The data center operating company 11 is not limited to one company. If the appliance maker and another management company share or jointly perform the data management, cloud server 11a management, and the like, both or one thereof corresponds to the data center operating company 11 (see FIG. 1C).

The service provider 12 holds at least a server 12a. The server 12a is a server device 200 described later, for example. The at least a server 12a may include plural servers 12a depending on the intended use.

The home gateway 10b is not essential in the aforementioned service. When the cloud server 11a performs management of all of the data, for example, the home gateway 10b is unnecessary. In some cases, the group 10 does not include any appliance that is not accessible to the Internet for itself, such as when all the appliances in the group 10 are connected to the Internet.

Next, a description is given of a flow of information in the aforementioned service. First, the plural appliances 10a of the group 10 individually send predetermined information (later-described electricity information and operating period information, for example) to the cloud server 11a of the data center operating company 11. The cloud server 11a collects information from the plural appliances 10a ((a) of FIG. 1A).

The aforementioned information is directly provided from the plural appliances 10a themselves to the cloud server 11a through the Internet in some cases. Alternatively, the information may be once collected from the plural appliances 10a to the home gateway 10b to be provided from the home gateway 10b to the cloud server 11a.

Next, the cloud server 11a of the data center operating company 11 provides the collected information to the service provider 12 by a certain unit. Herein, the certain unit can be a part of information by which the data center operating company 11 can organize and provide the collected information to the service provider 12 or a unit required by the service provider 12. The certain unit does not need to be constant, and the amount of information provided varies in accordance with the situation in some cases.

The information collected in the cloud server 11a is stored in a server 12a held by the service provider 12 when needed ((b) of FIG. 1A). The service provider 12 organizes the stored information into information suitable for the service to be provided to the user (image information described later, for example). The user to which the service is provided may be the user 1, who uses the plural appliances 10a, or a user 2 out of the group 10. The user 2 may be different from or the same as the user 1.

In regard to the way of providing a service to the user, the service may be provided from the service provider 12 directly to the user ((f) or (e) in FIG. 1A), for example. Alternatively, the service may be provided to the user again via the cloud server 11a of the data center operating company 11((c) or (d) in FIG. 1A), for example. The cloud server 11a of the data center operating company 11 may be configured to organize the collected information into information corresponding to the service to be provided to the user (later-described image information, for example) and provide the organized information to the service provider 12.

<Configuration of Information Presentation System>

Next, a description is given of a configuration example of the information presentation system according to the embodiment using FIG. 2. FIG. 2 is a block diagram illustrating an example of the configuration of the information presentation system of the embodiment.

As illustrated in FIG. 2, the information presentation system includes a terminal device 100, a server device 200, appliances 401 to 403, a distribution board 404, and a relay device 410.

In FIG. 2, the terminal device 100 and server device 200 are connected through a network 300. The relay device 410 and server device 200 are also connected through the network 300. The network 300 may be a wireless network, a wired network, or a network including both wireless and wired networks.

In FIG. 2, the appliances 401 to 403, distribution board 404, and relay device 410 are installed in a building (a predetermined area) owned or managed by the aforementioned group 10 (a company, an association, a family, or the like), for example.

The appliances 401 to 403 are electrical appliances that consume electricity (hereinafter, also referred to as appliances when needed), and examples thereof are illuminations, air conditioners, humidifiers, air cleaners, fans, refrigerators, dish washers, food processors, microwaves, ovens, washing machines, drying machines, driers, telephones, PCs, TVs, DVD (digital versatile disk) players, recording appliances (hard disk recorders, for example), audio appliances, game machines, network access appliances (wireless LAN routers, for example), and chargers. In the embodiment, the appliances 401 to 403 are electrical appliances whose appliance IDs (an example of identification information) for identifying the individual appliances are registered in the relay device 410 in advance. The number of previously registered electrical appliances is three (the electrical appliances 401 to 403) in the example illustrated in FIG. 2 but may be four or more.

The appliances 401 to 403 individually measure electricity consumption. Each of the appliances 401 to 403 generates individual electricity information indicating a time series of electricity consumption measured in a predetermined period (24 hours, for example; hereinafter also referred to as one day when needed). Each set of individual electricity information is given the corresponding appliance ID.

Each of the appliances 401 to 403 also generates operating period information indicating a time series of periods when the electricity consumption is larger than zero in the aforementioned predetermined period (periods when the appliance is operating (is turned on); hereinafter, referred to as operating periods). Each set of operating period information is given the corresponding appliance ID.

Each of the appliances 401 to 403 transmits the set of individual electricity information and the set of operating period information to the relay device 410 at a predetermined time.

The distribution board 404 is an electricity distribution device accommodating breakers and the like. The distribution board 404 measures at a main breaker, the total electricity consumption (hereinafter, referred to as total electricity) of electrical appliances installed inside or around a building owned or managed by the group 10, for example. Herein, the aforementioned electrical appliances may also include electrical appliances other than the appliances 401 to 403. The distribution board 404 generates total electricity information indicating a time series of total electricity measured in the predetermined period. The total electricity information is given a distribution board ID which can identify the distribution board 404. The distribution board ID is registered in the relay device 410 in advance.

The distribution board 404 transmits the total electricity information to the relay device 410 at a predetermined time.

The relay device 410 is a communication device configured to link the appliances 401 to 403 and distribution board 404 to the server device 200. The relay device 410 holds a table which associates the appliance IDs, distribution board IDs, and group IDs (IDs for identifying groups), that are previously registered, with one another. When receiving the sets of individual electricity information and operating period information from the appliances 401 to 403, the relay device 410 searches the table for the group ID associated with the appliance ID given to each set of received information and gives the group ID to each set of received individual electricity information and operating period information. When receiving the total electricity information from the distribution board 404, the relay device 410 searches the table for the group ID associated with the distribution board ID given to the received information and gives the group ID to the total electricity information. The relay device 410 transmits to the server device 200, the individual electricity information, operating period information, and total electricity information given the group ID.

In the example described above, the appliances 401 to 403 generate the individual electricity information and operating period information. However, the relay device 410 may be configured to receive information of the results of measuring the electricity consumption from the appliances 401 to 403 (or from a power meter which is connected to the plugs of the appliances 401 to 403 and is capable of measuring the electricity consumption thereof) and, based on the received information, generate the individual electricity information and operating period information. In the example described above, the distribution board 404 generates the total electricity information. However, the relay device 410 may be configured to receive information of the results of measuring the total electricity from the distribution board 404 and generate the total electricity information based on the received information.

In the example described above, the appliances 401 to 403 and distribution board 404 transmit information to the server device 200 through the relay device 410. However, the appliances 401 to 403 and distribution board 404 may be configured to send information to the server device 200 directly, not through the relay device 410.

Moreover, the aforementioned operation of the relay device 410 may be configured to be performed by the distribution board 404. In such a case, the system illustrated in FIG. 2 may be configured not to include the relay device 410.

Next, a description is given of a configuration example of the terminal device 100.

The terminal device 100 is an information processing device which is capable of using image information provided by the server device 200. Examples thereof are smart phones, tablets, PCs, TVs, and dedicated terminal devices. FIG. 2 illustrates only the single terminal device 100 as an example, but the system may include two or more terminal devices.

The image information includes information (hereinafter, referred to as operating period image information) of the operating period image representing a time series of the operating periods of each of the appliances 401 to 403 and information (hereinafter, referred to as total electricity image information) of the total electricity image representing the total electricity of the electrical appliances (including the appliances 401 to 403) installed in the group 10. The display examples of the operating period image and total electricity image are described later using FIGS. 5 and 6.

The terminal device 100 includes an input unit 101, a presentation unit 102, a storage 103, a transmitter/receiver 104, and information processor 105.

The input unit 101 is an input appliance such as a button or a touch panel.

The input unit 101 accepts various input operations performed by the user (hereinafter, referred to as user operations), for example. Examples of the input operations include an operation to give an instruction to display the image information, an operation to give an instruction to change a predetermined operating period, and an operation to give an instruction to terminate display of the image information.

The presentation unit 102 is a display device (a display medium) such as a display unit.

The presentation unit 102 displays the operating period image and total electricity image based on the image information received from the server device 200, for example.

The storage 103 is a storage device (or also referred to as a memory) such as a memory device or a hard disk device. The storage 103 may be configured to include either one or plural storage devices.

The storage 103 stores the group ID which identifies the group 10, for example. The group ID is given to information (various requests described later, for example) to be transmitted to the server device 200.

The storage 103 also stores the image information received from the server device 200, for example.

The transmitter/receiver 104 is a communication interface configured to transmit or receive information to or from other devices. The transmitter/receiver 104 may include a transmission/reception circuit transmitting and receiving information to and from other devices.

When the input unit 101 accepts a user operation, for example, the transmitter/receiver 104 transmits a request corresponding to the accepted operation to the server device 200. The request herein is an image display execution request, an operating period change request, or the like, for example.

The image display execution request is information to request the server device 200 to generate the image information and transmit the generated image information to the terminal device 100 when the operation to given an instruction to display the image information is performed.

The operating period change request is information requesting the server device 200 to update the image information and send the updated image information to the terminal device 100 when the operation to given an instruction to change an operating period is performed while the image information is displayed. To change an operating period includes to turn on or off the electricity supply to each appliance (also referred to as to add or delete the operating period, respectively), to move, shorten, or extend the operating period, or the other changing operations concerning the operating period but is not limited to the above operations. In the embodiment, as an example of changing an operating period, a description is given of turning off the electricity supply of a desired appliance during a desired operating period. The other examples of changing the operating period are described in modifications below.

The operating period change request includes change information indicating the change instructed by the aforementioned operation. The change information includes a change appliance ID indicating an appliance whose operating time is to be changed, change operating period information indicating an operating period to be changed, and changing process information indicating the type of the changing process. In the embodiment, it is assumed that the type of the changing process is to delete a predetermined operating period as an example. To delete a predetermined operating period is to set the electricity consumption at the operating period to zero (in other words, to turn off the electricity supply to the appliance during the operating period). The other examples of the changing process are described in modifications described below.

Each request described above is given a group ID.

The transmitter/receiver 104 receives image information from the server device 200, for example.

The information processor 105 is a control device (or a processing circuit), such as a processor, executing various types of information processing.

The information processor 105 may be configured so that programs corresponding to various processes are stored in the storage 103 in advance to be executed by the processor, for example. Alternatively, the information processor 105 may be configured by using a dedicated processing circuit executing various processes as a control device. The dedicated processing circuit is an ASIC (application-specific integrated circuit), a FPGA (field programmable gate arrays), or the like, for example.

When the input unit 101 accepts any one of the aforementioned user operations, for example, the information processor 105 causes the transmitter/receiver 104 to transmit a request corresponding to the user operation to the server device 200.

Moreover, when the transmitter/receiver 104 receives image information from the server device 200, for example, the information processor 105 once stores the received image information in the storage 103. Thereafter, the image processor 105 reads the stored image information from the storage 103 at a predetermined time and causes the presentation unit 102 to display the same.

Above is the description of the configuration example of the terminal device 100.

Next, a configuration example of the server device 200 is described.

The server device 200 is an information processing device (an information presentation apparatus) which provides to the terminal device 100, image information generated based on a request from the terminal device 100.

The server device 200 includes a transmitter/receiver 201, an information processor 202, and a storage 203.

The transmitter/receiver 201 is a communication interface configured to transmit/receive information to/from other devices. The transmitter/receiver 201 may include a transmission/reception circuit transmitting/receiving information to/from other devices.

The transmitter/receiver 201 receives the total electricity information, individual electricity information, and operating period information from the relay device 410.

The transmitter/receiver 201 receives various requests described above (the image display execution request or operating period change request, for example) from the terminal device 100, for example.

The transmitter/receiver 201 also transmits the image information generated by the information processor 202 to the terminal device 100, for example.

The information processor 202 is a control device (or a processing circuit), such as a processor, executing various types of information processing.

The information processor 202 may be configured so that programs corresponding to various processes are stored in the storage 203 in advance and are executed by the processor. Alternatively, the information processor 202 may employ a dedicated processing circuit executing various processes as a control device. The dedicated processing circuit is an ASIC, a FPGA, or the like, for example.

The information processor 202 may be configured to store a program corresponding to at least one of the various processes in the storage 203 in advance and causes the processor to execute the program. In this case, the information processor 202 includes a dedicated processing circuit to execute the other processes as the control appliance.

A configuration example of the information processor 202 is described later using FIG. 3.

The storage 203 is a storage device (or also referred to as a memory) such as a memory device or a hard disk device. The storage 103 may be configured to include either one or plural storage devices.

The storage 203 stores the total electricity information, individual electricity information, and operating period information received by the transmitter/receiver 201, for example.

Hereinafter, the configuration example of the information processor 202 (an example of the information presentation apparatus of the disclosure) is described using FIG. 3.

As illustrated in FIG. 3, the information processor 202 includes an electricity acquisition part 21, an operating period acquisition part 22, an electricity calculation part 23, and an image generation part 24.

The electricity acquisition part 21 acquires the total electricity information and individual electricity information received by the transmitter/receiver 201 and stores the received information in the storage 203.

When the image display execution request transmitted from the terminal device 100 through the network 300 is received by the transmitter/receiver 201, the electricity acquisition part 21 reads the total electricity information and individual electricity information given the same group ID as the group ID given to the received request from the storage 203. The electricity acquisition part 21 outputs the total electricity information and individual electricity information to the electricity calculation part 23 and image generation part 24.

Hereinafter, the total electricity information acquired by the electricity acquisition part 21 is referred to as first total electricity information, and the total electricity represented by the first total electricity information is referred to as first total electricity. The individual electricity information acquired by the electricity acquisition part 21 is referred to as first individual electricity information, and the individual electricity represented by the first individual electricity information is referred to as first individual electricity.

The operating period acquisition part 22 acquires the operating period information received by the transmitter/receiver 201 and stores the received information in the storage 203.

When the image display execution request is received by the transmitter/receiver 201, the operating period acquisition part 22 reads the operating period information given the same group ID as the group ID given to the received request from the storage 203. The operating period acquisition part 22 outputs the read operating period information to the image generation part 24.

Hereinafter, the operating period information acquired by the operating period acquisition part 22 is referred to as first operating period information, and the operating periods represented by the first operating period information is referred to as first operating periods.

When the operating period change request transmitted from the terminal device 100 through the network 300 is received by the transmitter/receiver 201, the electricity calculation part 23 receives the change information included in the request from the transmitter/receiver 201. The electricity calculation part 23 calculates the total electricity based on the change information, first total electricity information, and first individual electricity information. The change information includes the change appliance ID, change operating period information, changing process information as described above.

A description is given of an example of the process of calculating the total electricity.

The electricity calculation part 23 first specifies a set of first individual electricity information given the same appliance ID as the change appliance ID among the sets of first individual information of the appliances 401 to 403.

Next, the electricity calculation part 23 specifies an operating period represented by the change operating period information among the predetermined periods represented by the specified set of first individual electricity information (24 hours, for example).

Next, the electricity calculation part 23 executes the changing process represented by the changing process information for the electricity consumption at the specified operating period. When the changing process information represents deletion of an operating period, the electricity calculation part 23 sets the electricity consumption at the specified operating period to zero. The specified first individual electricity information is thus updated. Hereinafter, the first individual electricity information updated is referred to as second individual electricity information, and the individual electricity represented by the second individual electricity information is referred to as second individual electricity.

Next, the electricity calculation part 23 calculates the total electricity based on the first total electricity and the difference between the second and first individual electricities corresponding to the change appliance ID and generates information indicating the calculated total electricity. The first total electricity is thus updated. Hereinafter, the updated first total electricity information is referred to as second total electricity information, and the total electricity represented by the second total electricity information is referred to as a second total electricity.

In the above description, the second total electricity is calculated using the first total electricity information. However, the following calculation method may be used when the sum of the first individual electricities of the appliances 401 to 403 is equal to the first total electricity (in other words, the first total electricity does not include electricity consumption of an appliance not registered). To be specific, the electricity calculation part 23 may calculate the second total electricity based on the sum of the second individual electricity corresponding to the change appliance ID and the first individual electricities corresponding to the appliance IDs other than the change appliance ID.

Next, the electricity calculation part 23 outputs the second total electricity information and change information to the image generation part 24.

Above is the description of an example of the process of calculating the total electricity.

The image generation part 24 generates the image information when the transmitter/receiver 201 receives the image display execution request and when the transmitter/receiver 201 receives the operating period change request. The generation of image information in the latter case is also referred to as updating of the image information.

Herein, examples of the process of generating the image information are described.

First, a description is given of an example of the process of generating the image information when the transmitter/receiver 201 receives the image display execution request transmitted from the terminal device 100.

The image generation part 24 receives the first total electricity information from the electricity acquisition part 21 and receives first operating period information (first operating period information of the appliances 401 to 403, for example) from the operating period acquisition part 22.

Next, the image generation part 24 generates information (hereinafter, referred to as first total electricity image information) of a first total electricity image representing a time series of the first total electricity represented by the first total electricity information. The first total electricity image displayed based on the first total electricity image information is a first total electricity image 500 described later in FIG. 5, for example.

The image generation part 24 generates information (hereinafter, referred to as first operating period image information) of a first operating period image representing a time series of the first operating periods represented by the sets of first operating period information of the appliances 401 to 403. The first operating period image displayed based on the first operating period image information is a first operating period image 501 described later in FIG. 5, for example.

Next, the image generation part 24 generates first image information including the first total electricity image information and first operating period image information. The image generation part 24 stores the generated first image information in the storage 203. The generated first image information includes control information controlling the terminal device 100 so that the first total electricity image and first operating period image are displayed together on the screen. By the control information, the first total electricity image and first operating period image can be displayed together on the presentation unit 102 (display unit) of the terminal device 100, which is connected to the server device 200 via the network 300.

The image generation part 24 reads the first image information stored in the storage 203 and outputs the first image information to the transmitter/receiver 201. The first image information is transmitted to the terminal device 100 by the transmitter/receiver 201. In the terminal device 100, screen display is then performed based on the first image information, and the first total electricity image and first operating period image are displayed on the presentation unit 102 (display unit).

Next, a description is given of an example of the process of generating the image information when the transmitter/receiver 201 receives the operating period change request transmitted from the terminal device 100. The description is given of an example of the process of generating the image information after the second total electricity information is generated by the above-described process of calculating the total electricity.

The image generation part 24 receives the second total electricity information and change information from the electricity calculation part 23. The change information includes the change appliance ID, change operating period information, and changing process information as described above.

Next, the image generation part 24 discards the first total electricity image information and generates information (hereinafter, referred to as second total electricity image information) of a second total electricity image representing a time series of the second total electricity represented by the second total electricity information. The second total electricity image displayed based on the second total electricity image information is a second total electricity image 502 later described in FIG. 6, for example.

The image generation part 24 generates information (hereinafter, referred to as second operating period image information) of a second operating period image reflecting the operating period specified by the user. This generation process is described in detail later. The second operating period image displayed based on the second operating period image information is a second operating period image 503 described later in FIG. 6, for example.

Herein, an example of the process of generating the second operating period image information is described below.

First, the image generation part 24 specifies a set of first operating period information given the same appliance ID as the change appliance ID among the sets of first operating period information of the appliances 401 to 403.

Next, the image generation part 24 specifies a change operating period represented by the change operating period information among the first operating periods represented by the specified set of first operating period information.

Next, the image generation part 24 executes the changing process represented by the changing process information for the specified first operating period. When the changing process information represents deletion of an operation period, for example, the image generation part 24 deletes the change operating period from the first operating periods. The specified first operating period information is thus updated. Hereinafter, the first operating period information updated is referred to as second operating period information, and the operating periods represented by the second operating period information are referred to as second operating periods.

Next, the image generation part 24 generates the second operating period image information indicating the second operating periods.

Above is the description of an example of the process of generating the second operating period image information.

Next, the image generation part 24 generates the second image information including the second total electricity image information and second operating period image information. The image generation part 24 stores the generated second image information in the storage 203. The generated second image information includes control information controlling the terminal device 100 so that the second total electricity image and second operating period image are displayed together on the screen.

By the control information, the second total electricity image and second operating period image can be displayed together on the presentation unit 102 (display unit) of the terminal device 100, which is connected to the server device 200 via the network 300.

The image generation part 24 reads the second image information stored in the storage 203 and outputs the second image information to the transmitter/receiver 201. The second image information is transmitted to the terminal device 100 by the transmitter/receiver 201. In the terminal device 100, thereafter, screen display is performed based on the second image information. The screen display of the presentation unit 102 (display unit) is thus updated from the first to second total electricity images and from the first to second operating period images.

Above is the description of the examples of the processes of generating the image information.

Hereinabove, the configuration example of the server device 200 is described.

<Operation of Information Processor 202>

Figure 4:
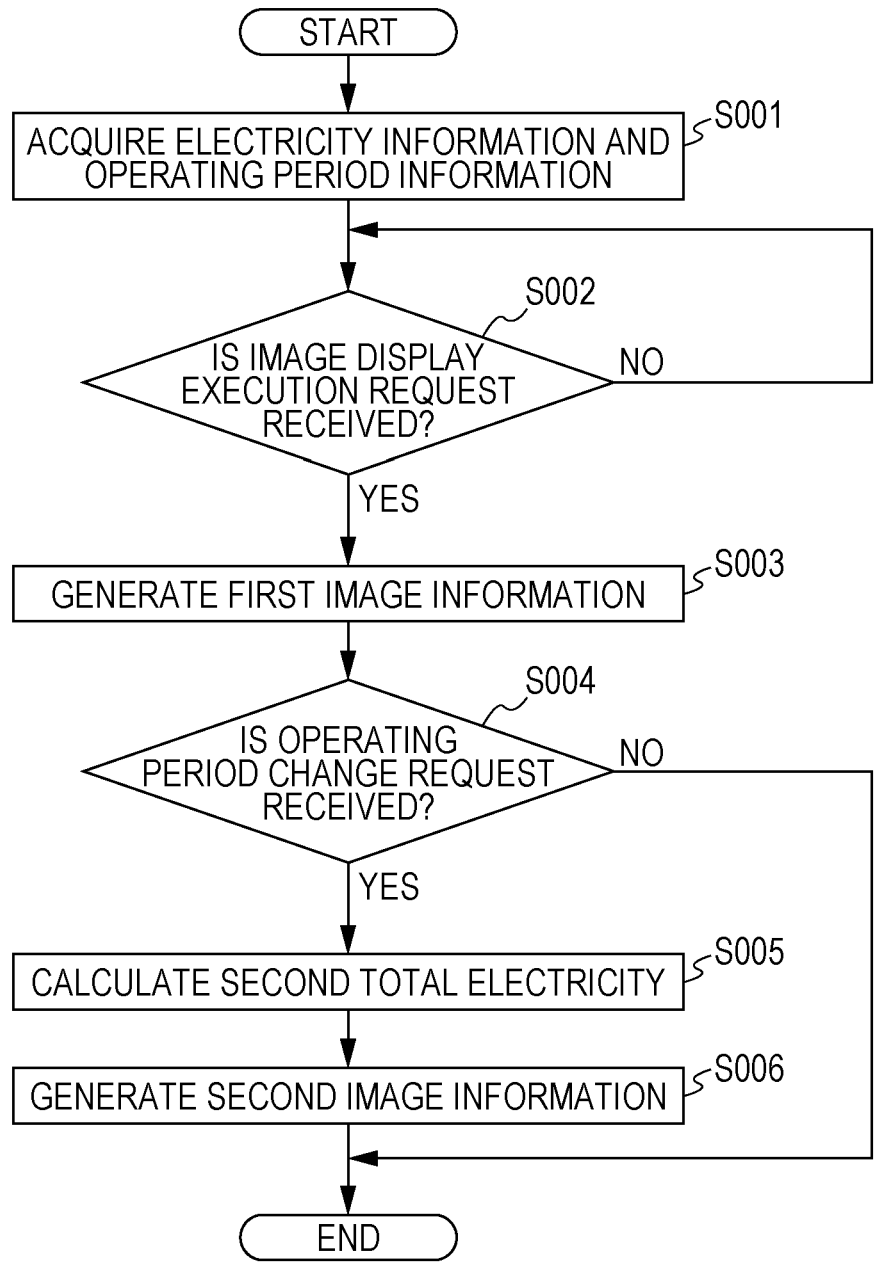
FIG. 4 is a flowchart presenting an example of the operation of the information processor according to the embodiment.

Next, a description is given of an operation example of the information processor 202 according to the embodiment using FIG. 4. FIG. 4 is a flowchart presenting the operation example of the information processor 202 of the embodiment.

The electricity acquisition part 21 acquires the first total electricity information and the sets of first individual electricity information of the appliances 401 to 403 from the transmitter/receiver 201 and stores the acquired information in the storage 203 (step S001).

The operating period acquisition part 22 acquires the sets of first operating period information of the appliances 401 to 403 from the transmitter/receiver 201 and stores the acquired information in the storage 203 (step S001).

The electricity acquisition part 21 and operating period acquisition part 22 stand by until the image display execution request is received (step S002; NO).

When the image display execution request is received by the transmitter/receiver 201 (step S002; YES), the electricity acquisition part 21 reads the first total electricity information and the sets of first individual electricity information of the appliances 401 to 403 from the storage 203. The electricity acquisition part 21 outputs the first total electricity information to the image generation part 24 and outputs the first total electricity information and the sets of first individual electricity information of the appliances 401 to 403 to the electricity calculation part 23.

When the image display execution request is received by the transmitter/receiver 201 (step S002; YES), the operating period acquisition part 22 reads the sets of first operating period information of the appliances 401 to 403 from the storage 203 and outputs the read information to the image generation part 24.

Next, the image generation part 24 generates the first image information including the first total electricity image information, first operating period image information, first control information, and the like based on the first total electricity information and the sets of first operating period information of the appliances 401 to 403 (step S003). The generated first image information is stored in the storage 203.

Next, the image generation part 24 reads the first image information stored in the storage 203 and outputs the first image information to the transmitter/receiver 201. The transmitter/receiver 201 transmits the first image information to the terminal device 100. In the terminal device 100, then, screen display based on the first image information is performed, and the first total electricity image and first operating period image are displayed together on the presentation unit 102 (display unit).

Figure 5:
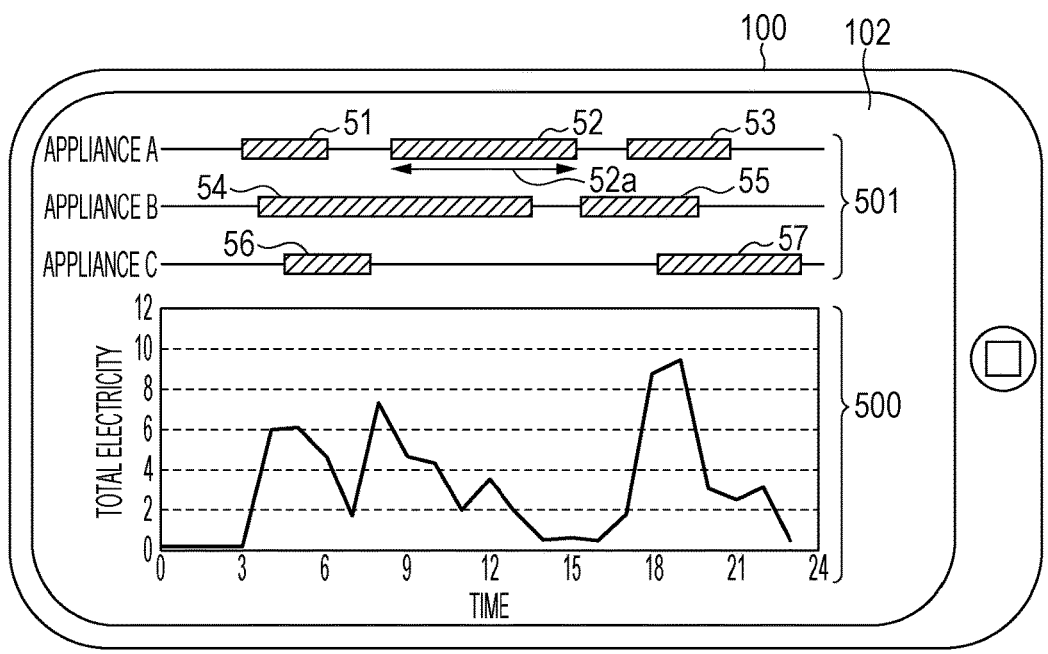
FIG. 5 is a view illustrating a display example of image information according to the embodiment.

Herein, a display example based on the first image information is described using FIG. 5. FIG. 5 is a view illustrating an example of the first total electricity image and first operating period image displayed on the presentation unit 102 of the terminal device 100.

As illustrated in FIG. 5, the first total electricity image 500 and first operating period image 501 are displayed together on the presentation unit 102 of the terminal device 100.

The first total electricity image 500 includes a graph presenting a time series of the total electricity of the electrical appliances installed in the group 10, for example. In this graph, the vertical axis represents the total electricity (kilowatt, for example), and the horizontal axis represents time. The horizontal axis represents 24 hours (one day) as an example. The first total electricity image 500 presents a time series of the total electricity (the sum of electricity consumption of the appliances) measured in a certain day. The first operating period image presents a line chart by way of example herein but is not limited thereto.

The first operating period image 501 is an image representing a time series of the operating periods of each of the appliances 401 to 403 installed in the group 10, for example. The first operating period image 501 includes an appliance name image representing the name of each appliance and a time axis image representing a time axis for each appliance. In the appliance name images, Appliance A indicates the appliance 401; Appliance B, the appliance 402; and Appliance C, the appliance 403, for example. The time axis images correspond to the time axis (the horizontal axis) in the first total electricity image 500.

On the time axis images, operating period images 51 to 57 are superimposed and displayed. In other words, the operating period images 51 to 57 present a time series of the operating periods of each of the appliances 401 to 403 measured in a certain day. The operating period images 51 to 53 are images representing operating periods of Appliance A. The operating period images 54 and 55 are images representing operating periods of Appliance B. The operating period images 56 and 57 are images representing operating periods of Appliance C. The operating period images 51 to 57 have rectangular shapes by way of example but are not limited thereto.

Above is the description of the display example of the first image information.

By displaying the first image information as described above, the user can know a time series of changes in the total electricity and a time series of the operating periods of the appliances 401 to 403 in a certain past day. Herein, the user can make simulation of changes in the total electricity when at least one of the appliances 401 to 403 is not operated during a desired period.

When the user wants to know how the total electricity changes if Appliance A does not operate during an operating period 52a presented by the operating period image 52, the user performs an operation to specify the operating period 52a. The arrow indicating the operating period 52a is illustrated for convenience of explanation and is not displayed on the screen. The operation to specify the operating period 52a may be an operation of touching the displayed part of the operating period image 52 with a finger (tapping, for example), an operation of moving a pointer to the displayed section of the operating period image 52 and clicking the same, or another operation. In this example, it is previously determined that when the desired operating period is specified by the above operation, deletion of the operating period is execution.

When the input unit 101 accepts the operation, the information processor 105 generates the change information including the change specified by the user's operation. The change information includes the change appliance ID indicating Appliance A, the change operating period information indicating the operating period 52a, and the changing process information indicating deletion of the operating period. The change information is transmitted to the server device 200 together with the operating period change request. The description returns to FIG. 4 below.

The electricity calculation part 23 determines whether the operating period change request is received by the transmitter/receiver 201 (step S004). When the operating period change request is not received (step S004; NO), the flow is terminated. On the other hand, when the operating period change request is received (step S004; YES), the flow goes to step S005.

In step S005, the electricity calculation part 23 calculates the second total electricity based on the change information included in the operating period change request and the electricity information received from the electricity acquisition part 21 (step S005).

Herein, a description is given of an example of the process of calculating the total electricity in the step S005. Herein, the change information includes the change appliance ID indicating Appliance A, the change operating period information indicating the operating period 52a, and the changing process information indicating deletion of an operating period.

The electricity calculation part 23 specifies the set of first individual electricity information of the appliance 401, which is given the appliance ID indicating Appliance A, among the sets of first individual electricity information of the appliances 401 to 403.

Next, the electricity calculation part 23 sets the electricity consumption at the operating period 52a to zero in the time series of electricity consumption represented by the first individual electricity information of the specified appliance 401. The first individual electricity information of the appliance 401 is updated to the second individual electricity information.

Next, the electricity calculation part 23 calculates the second total electricity based on the first total electricity and the difference between the second and first individual electricities of the appliance 401, for example.

The electricity calculation part 23 outputs the second total electricity information indicating the second total electricity and the change information to the image generation part 24.

Above is the description of an example of the process of calculating the total electricity in the step S005. The description goes back to FIG. 4.

Next, the image generation part 24 generates the second image information including the second total electricity image information, second operating period image information, and control information based on the second total electricity information and change information (step S006). The image generation part 24 discards the first total electricity image information and generates the second total electricity image information based on the second total electricity information. The image generation part 24 generates the second operating period image information based on the change information and the sets of first operating period information of the appliances 401 to 403, for example. The generated second image information is stored in the storage 203. The second image information includes the control information for controlling the terminal device 100 so that the second total electricity image and second operating period image are displayed together on the screen as described above.

Herein, a description is given of an example of the process of generating the second operating period image information in step S006 below. As an example, the change information includes the change appliance ID indicating Appliance A, the change operating period information indicating the operating period 52a, and the changing process information indicating deletion of an operating period.

The image generation part 24 specifies the set of first operating period information of the appliance 401, which is given the appliance ID indicating Appliance A, among the sets of first operating period information of the appliances 401 to 403. The first operating period information of the appliance 401 is information indicating a time series of the operating periods of Appliance A (appliance 401) as described above.

Next, the image generation part 24 specifies the operating period 52a among the operating periods represented by the set of first operating period information of the specified appliance 401, that is, among the operating periods represented by the operating period images 51 to 53.

Next, the image generation part 24 deletes the information of the specified operating period 52a from the information of the operating periods presented by the operating period images 51 to 53 so that all or a part of the operating period image 52 corresponding to the operating period 52a is not displayed. The first operating period information of the appliance 401 is thus updated to the second operating period information.

Above is the description of an example of the process of generating a second operating period image.

Next, the image generation part 24 reads the second image information stored in the storage 203 and outputs the second image information to the transmitter/receiver 201. The transmitter/receiver 201 transmits the second image information to the terminal device 100. In the terminal device 100, screen display is performed based on the second image information, and the second total electricity image and second operating period image are displayed together on the presentation unit 102 (display unit).

Figure 6:
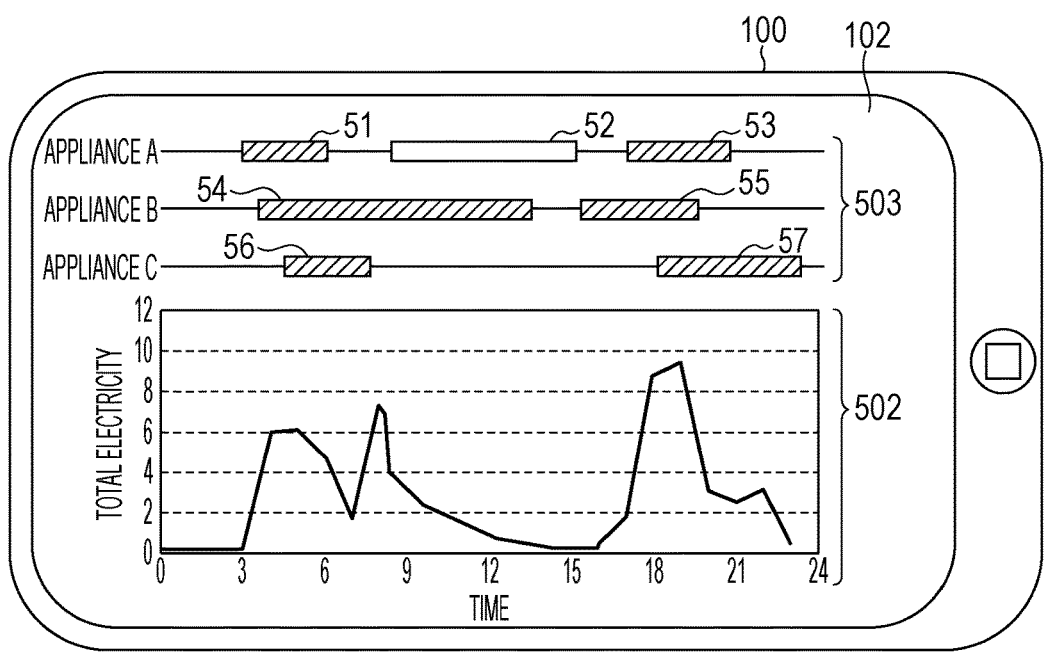
FIG. 6 is a view illustrating a display example of the image information according to the embodiment.

Herein, a description is given of a display example based on the second image information using FIG. 6. FIG. 6 is a diagram illustrating an example of the second total electricity image and second operating period image displayed on the presentation unit 102 of the terminal device 100.

As illustrated in FIG. 6, the second total electricity image 502 and second operating period image 503 are displayed together on the presentation unit 102 of the terminal device 100.

The second total electricity image 502 and second operating period image 503 reflect a change of the operating period specified by the user. In other words, the second total electricity image 502 graphically plots the total electricity of the electrical appliances installed in the group 10 over time on the conditions that Appliance A does not operate during the operation period 52a. In the second operating period image 503, the operating period image 52 representing the operating period specified by the user has only the outline. In other words, the part of the operating period image 53 other than the outline is not displayed (is erased).

Above is the description of a display example of the second image information.

By displaying the second image information as described above, the user can know a change of the total electricity (including a shift of the peak time of total electricity) when at least one of the appliances 401 to 403 does not operate during a desired period in a certain day.

When the second image information is displayed, the user can make an instruction to change an operating period again. In this case, the flow returns to step S004, and the processes in the steps S005 and S006 are performed again. In such a manner, the processes in the steps S005 and S006 may be repeatedly performed in accordance with user's operation to give an instruction to change an operating period.

Above is the description of the operation example of the information processor 202.

According to the embodiment, the user can know a change in the total electricity consumption when a desired electrical appliance is assumed not to be in operation during a desired period (when the desired electrical appliance is off during the desired operating period).

MODIFICATIONS OF EMBODIMENT

Above is the description of the embodiment of the disclosure, but the disclosure can be variously changed without departing from the scope of the disclosure. A description below is given of modifications of the embodiment described above. The description of the modifications includes mainly differences from the embodiment.

Modification 1

In the example described in the above embodiment, the user specifies deletion of the whole range of one operating period (the whole operating period 52a, for example). However, the embodiment is not limited thereto. The user may specify deletion of a part of one operating period (in other words, shortening of the operating period), for example. This example is described below.

The user performs an operation to specify the operating period that the user wants to delete within a range of the operating period 52a in FIG. 5, for example. The user performs an operation of touching and tracing the displayed section corresponding to the operating period that the user wants to delete (for example, an operating period 52b in FIG. 7) in the displayed section of the operating period image 52 with the finger, for example.

Figure 7:
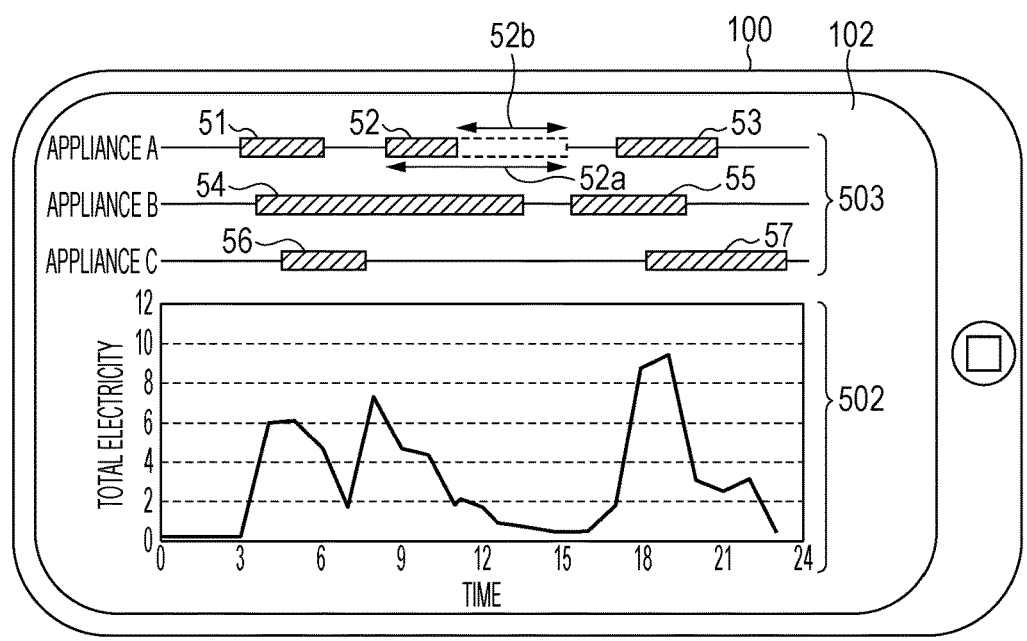
FIG. 7 is a view illustrating a display example of image information according to modification 1 of the embodiment.

FIG. 7 illustrates a display example of the second image information generated based on the change information indicating what are instructed by the above operation. In FIG. 7, the second total electricity image 502 presents the second total electricity calculated by excluding the operating period 52b. In FIG. 7, the operating period image 52 in the second operating period image 503 presents an operating period which is a part of the operating period 52a other than the operating period 52b. In FIG. 7, the image representing the operating period 52b includes only the outline, for example.

In FIG. 7, the arrows indicating the operating periods 52a and 52b are illustrated for convenience of explanation and are not displayed on the screen.

According to Modification 1, as described above, the user can know how the total electricity changes when Appliance A is not operated during a part of the operating period 52a.

Modification 2

In Modification 2, the user may specify deletion of plural operating periods. Specific examples 1 and 2 thereof are described below.

First, specific example 1 is described. For example, the user performs an operation to specify all of the operating periods of Appliance A in FIG. 5. The user performs an operation of touching the displayed sections of the operating period images 51 to 53 with the finger, for example. Alternatively, the user performs an operation of touching the displayed section of the characters "Appliance A" with the finger, for example.

Figure 8A:
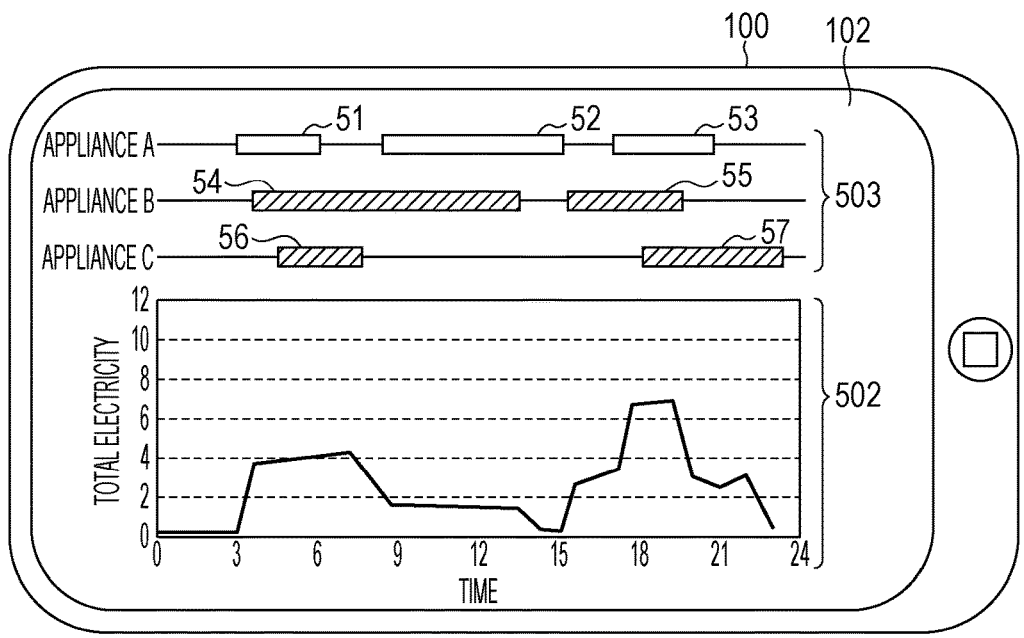
FIGS. 8A and 8B are views illustrating display examples of image information according to modification 2 of the embodiment.

FIG. 8A illustrates a display example of the second image information generated based on the change information indicating what is instructed by the aforementioned operation. In FIG. 8A, the second total electricity image 502 presents the second total electricity calculated by excluding all the operating periods of Appliance A. The operating period images 51 to 53 in the second operating period image 503 present only the outlines in FIG. 8A.

According to specific example 1, as described above, the user can know how the total electricity changes when Appliance A is not operated during the entire predetermined period.

Next, specific example 2 is described. For example, the user performs an operation to specify all of the operating periods of Appliances A to C in FIG. 5. The example of the operation is the same as that of specific example 1 described above.

Figure 8B:
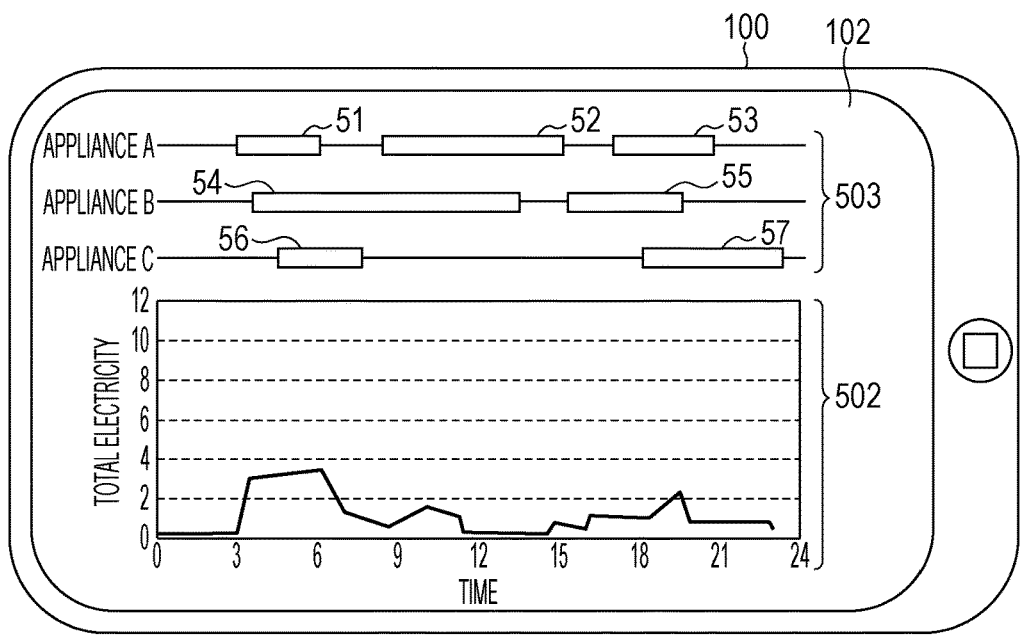

FIG. 8B illustrates a display example of the second image information generated based on the change information indicating the instruction of the above operation. In FIG. 8B, the second total electricity image 502 presents the second total electricity calculated by excluding all the operating periods of Appliances A to C. The operating period images 51 to 57 in the second operating period image 503 present only the outlines in FIG. 8B.

According to specific example 2, as described above, the user can know how the total electricity changes when Appliances A to C are not operated in the entire predetermined period. In other words, the user can know the total electricity of appliances (unregistered appliances) other than Appliances A to C, which are already registered. According to specific example 2, moreover, it is possible to prompt the user to identify and register unregistered appliances.

Modification 3

In the embodiment, the user can specify addition of an operating period, for example. An example thereof is described below.

The user performs an operation to specify an operating period that the user wants to newly add on the time axis of Appliance C in FIG. 5, for example. The user performs an operation of touching and tracing displayed part corresponding to the operating period intended to be added (an operating period 58a in FIG. 9, for example) on the time axis of Appliance C, for example.

Figure 9:
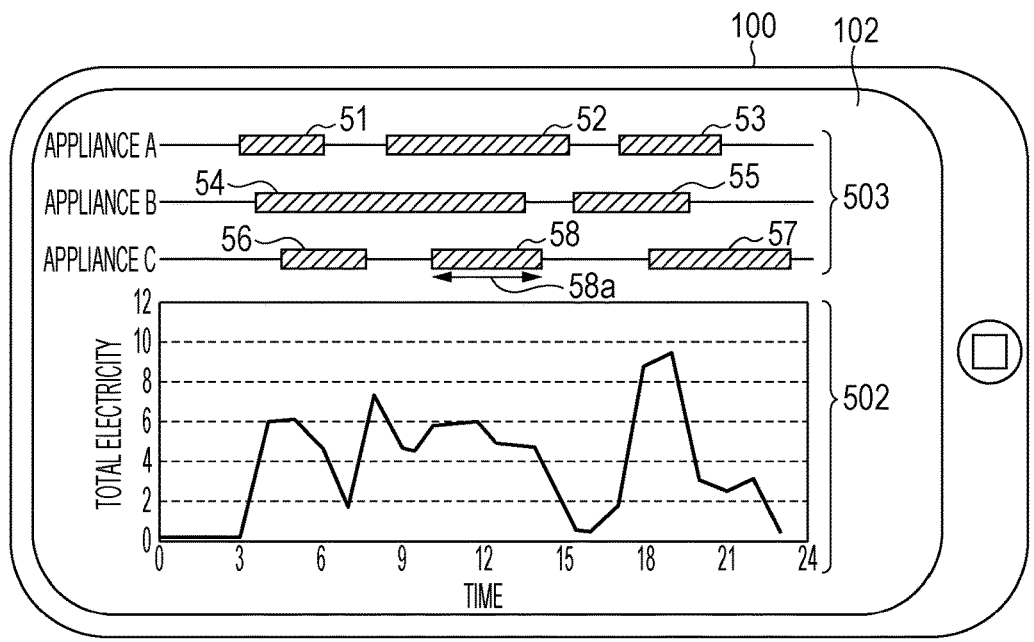
FIG. 9 is a view illustrating a display example of image information according to modification 3 of the embodiment.

FIG. 9 illustrates a display example of the second image information generated based on the change information indicating the instruction of the above operation. In FIG. 9, the second total electricity image 502 presents the second total electricity calculated by including the operating period 58a of Appliance C. The calculation of the second total electricity herein employs typical electricity consumption previously prepared, for example. The electricity calculation part 23 adds typical electricity consumption of Appliance C for the operating period 58a to the first individual electricity of Appliance C to calculate the second individual electricity of Appliance C and uses the calculated second individual electricity of Appliance C to calculate the second total electricity.

In FIG. 9, the operating period image 58 in the second operating period image 503 presents the operating period 58a.

In the example described above, the operating period 58a, which does not overlap any of the operating period images 56 and 57, is added. However, the user may specify addition of an operating period to the operating period image 56 or 57 (in other words, extension of an operating period).

In FIG. 9, the arrow indicating the operating period 58a is illustrated for convenience of explanation and is not displayed on the screen.

According to Modification 3, as described above, the user can know how the total electricity changes when Appliance C is operated during the operating period 58a. In other words, the user can know a change in the total electricity consumption when a desired electrical appliance is turned on during a desired operating period.

Modification 4

In the embodiment, the user may specify moving of an operating period, for example. An example thereof is described below.

The user performs an operation to specify an operating period of Appliance C that the user wants to move and specify the destination operating period, for example. For example, the user first touches the displayed section of the operating period image 57 corresponding to the operating period to be moved (an operating period 57a in FIG. 10, for example) with a finger to specify the entire operating period image 57. Next, the user keeps the finger touching the screen as tracing the time axis image of Appliance C leftward on the screen and then separates the finger from the screen at the displayed section of the destination operating period (an operating period 59a of FIG. 10, for example).

Figure 10:
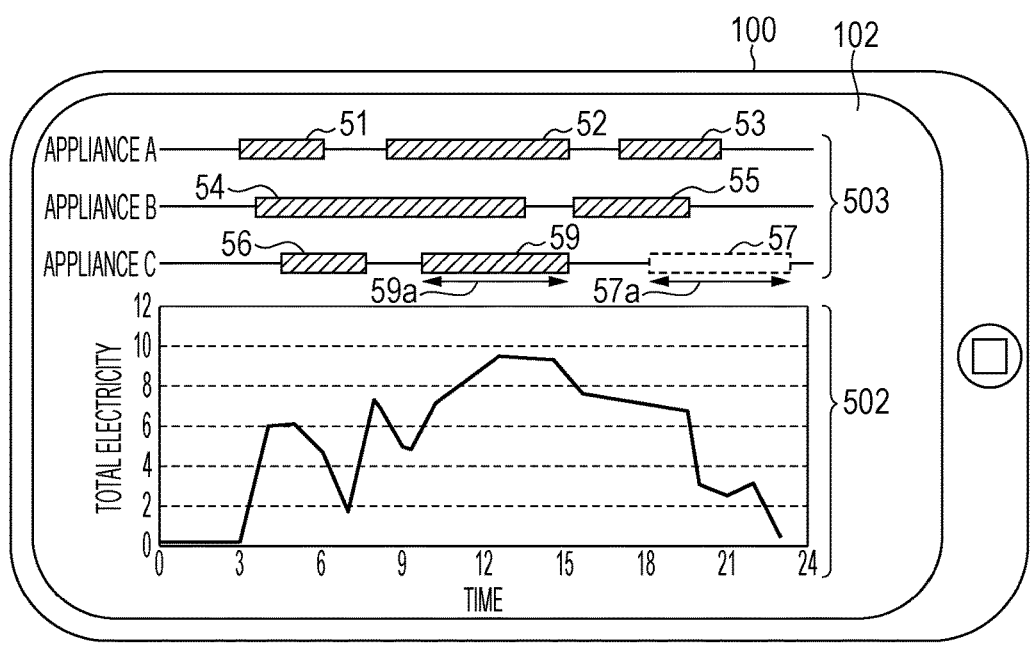
FIG. 10 is a view illustrating a display example of image information according to modification 4 of the embodiment.

FIG. 10 illustrates a display example of the second image information generated based on the change information indicating the instruction of the above operation. In FIG. 10, the second total electricity image 502 presents the second total electricity calculated by including the operating period 59a and excluding the operating period 57a. The calculation of the second total electricity herein employs electricity consumption for the operating period specified by the user (a part of the first individual electricity). The electricity calculation part 23 deletes the electricity consumption for the operating period 57a specified by the user and adds the deleted electricity consumption to the operating period 59a to calculate the second individual electricity of Appliance C and uses the second individual electricity of Appliance C to calculate the second total electricity.

In FIG. 10, the operating period image 59 in the second operating period image 503 presents the operating period 59a. In FIG. 10, the operating period image 57 in the second operating period image 503 presents only the outline.

In FIG. 10, the arrows indicating the operating periods 57a and 59a are illustrated for convenience of explanation and are not displayed on the screen.

According to Modification 4, as described above, the user can know how the total electricity changes when Appliance C is operated during the operating period 59a instead of the operating period 57a. In other words, the user can know a change in the total electricity consumption when a desired operating period of a desired electrical appliance is changed.

Modification 5

Figure 11:
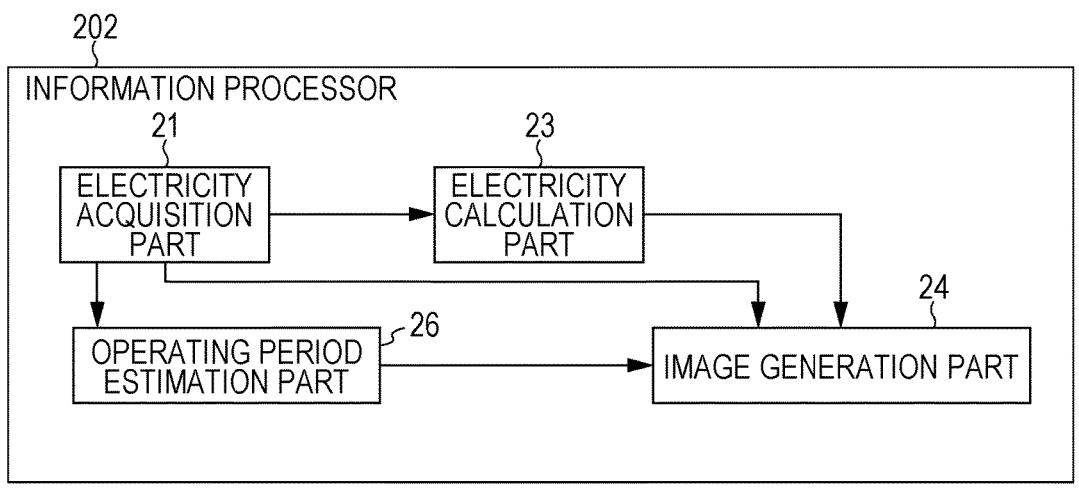
FIG. 11 is a block diagram illustrating an example of the configuration of the information processor according to modification 5 of the embodiment.

A description is given of another configuration example of the information processor 202 using FIG. 11. FIG. 11 is different from FIG. 3 in that the information processor 202 includes an operating period estimation part 26 instead of the operating period acquisition part 22.

When the image display execution request is received by the transmitter/receiver 201, the electricity acquisition part 21 reads the first total electricity information and the sets of first individual electricity information of the appliances 401 to 403 from the storage 203 and outputs the read information to the electricity calculation part 23. The electricity acquisition part 21 outputs the first total electricity information to the image generation part 24 and outputs the sets of first individual electricity information of the appliances 401 to 403 to the operating period estimation part 26.

The operating period estimation part 26 estimates operating periods of each of the appliances 401 to 403 based on the sets of first individual electricity information of the appliances 401 to 403. For example, the operating period estimation part 26 estimates the period when the electricity consumption of the first individual electricity information of the appliance 401 is larger than zero to be an operating period and generates the first operating period information of the appliance 401 representing the estimated operating period. In a similar manner, the operating period estimation part 26 generates the sets of first operating period information of the appliances 402 and 403. The operating period estimation part 26 outputs the sets of first operating period information of the appliances 401 to 403 to the image generation part 24.

According to Modification 5, as described above, the server device 200 can generate the sets of first operating period information based on the first individual electricity information and does not need to receive the operating period information. Accordingly, it is possible to eliminate the function to generate the operating period information from the appliances 401 to 403 and the like and reduce the amount of information transmitted from the relay device 410 and the like to the server device 200.

Modification 6

Figure 12:
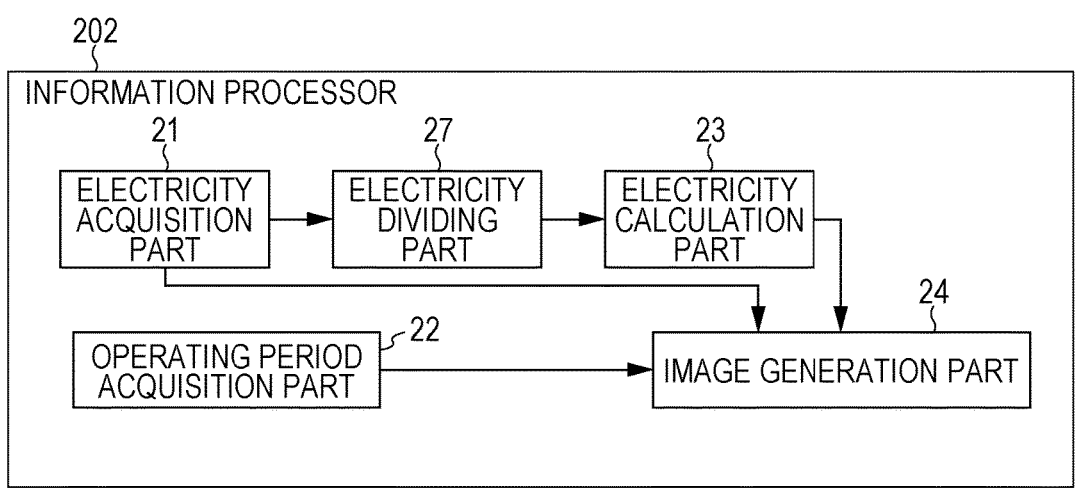
FIG. 12 is a block diagram illustrating an example of the configuration of the information processor according to modification 6 of the embodiment.

A description is given of another configuration example of the information processor 202 using FIG. 12. FIG. 12 is different from FIG. 3 in that the information processor 202 includes an electricity dividing part 27.

The electricity acquisition part 21 acquires only the first total electricity information and stores the first total electricity information in the storage 203. The first total electricity information acquired herein may be received by the server device 200 from the distribution board 404 through the relay device 410 or may be received by the server device 200 directly from the distribution board 404.

When the image display execution request is received by the transmitter/receiver 201, the electricity acquisition part 21 reads the first total electricity information from the storage 203 and then outputs the read first total electricity information to the electricity dividing part 27 and the image generation part 24.

The electricity dividing part 27 uses a predetermined method to calculate the first individual electricities of the appliances 401 to 403 based on the first total electricity represented by the first total electricity information. The predetermined method can be a method disclosed in a publicly-known document (Iwafune Yumiko, two others, "Pattern Analysis of Residential Electricity Consumption Using Circuit Level Monitoring Data", EEJ Transactions on Electronics, Information and Systems, 2013, Vol. 133 No. 5 pp. 1086-1093), for example.

The electricity dividing part 27 outputs the first individual electricity information indicating the first individual electricities obtained by the calculation (the sets of first individual electricity information of the appliances 401 to 403, for example) to the electricity calculation part 23.

According to Modification 6, as described above, the server device 200 can generate the first individual electricity information based on the first total electricity information and does not need to receive the first individual electricity information. Accordingly, it is possible to eliminate the function to generate the individual electricity information from the appliances 401 to 403 and the like and reduce the amount of information transmitted from the relay device 410 and the like to the server device 200.

Modification 7

Figure 13:
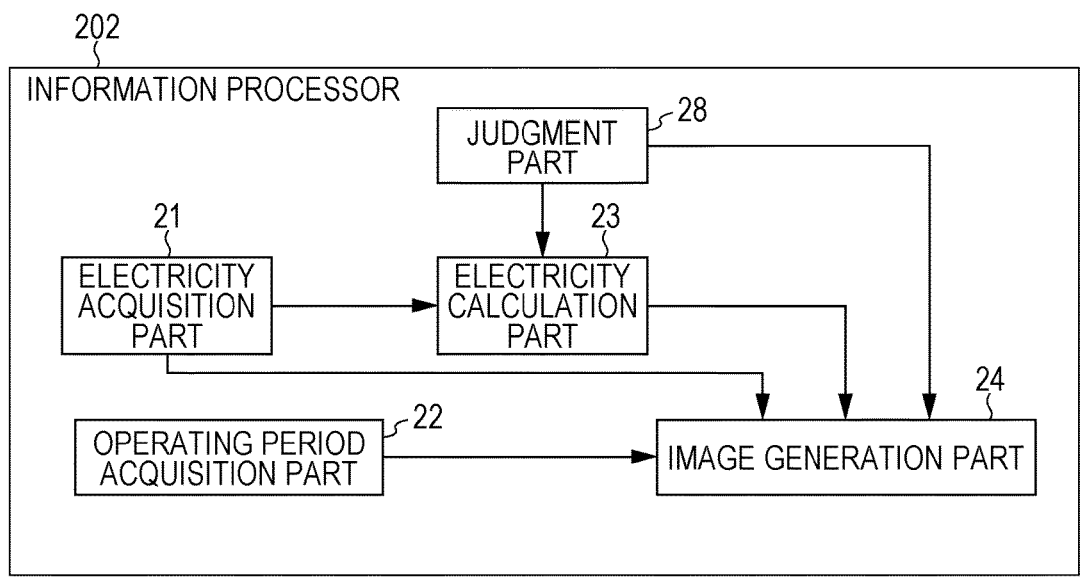
FIG. 13 is a block diagram illustrating an example of the configuration of the information processor according to modification 7 of the embodiment.

A description is given of another configuration example of the information processor 202 using FIG. 13. FIG. 13 is different from FIG. 3 in that the information processor 202 includes a judgment part 28.

The storage 203 stores an associated appliance table in advance. The associated appliance table includes associated appliances which are more likely to be used simultaneously with a predetermined appliance (hereinafter, referred to as a parent appliance). For example, a DVD player is likely to be used simultaneously with a television (an example of the parent appliances) and is therefore an associated appliance of a television. In this case, the appliance ID of the DVD player is registered in association with the appliance ID of the television in the associated appliance table. Moreover, the television is more likely to be used simultaneously with an illumination (an example of the parent appliances) in a living room, for example. Accordingly, the television is the associated appliance of the illumination. In this case, the appliance ID of the television is registered in association with the appliance ID of the illumination in the living room in the associated appliance table.

Such associations of appliances may be registered by the user of the terminal device 100 or an administrator of the server device 200 or may be registered by a learning process of the information processor 202, for example. In the latter case, a learning section (not illustrated) of the information processor 202 may be configured to associate the appliances whose operating periods represented by the operating period information overlap each other by a predetermine period (a previously set period) or more and register the appliances to the storage 203.

The associated appliance table may be configured to associate one parent appliance with plural associated appliances. For example, the illumination appliance (an example of the parent appliances) in the living room may be associated with plural appliances installed in the living room (a television, a DVD player, an air conditioner, and the like).

The associated appliance table is stored for each group in the storage 203, for example. Each associated appliance table is given the group ID.

When the operating period change request is received by the transmitter/receiver 201, the judgment part 28 reads the associated appliance table given the same group ID as the group ID included in the request from the storage 203. The judgment part 28 extracts the change appliance ID from the change information included in the operating period change request.

Next, the judgment part 28 determines whether the same appliance ID as the change appliance ID is registered as a parent appliance in the associated appliance table.

As the result of the above determination, when the same appliance ID as the change appliance ID is not registered as a parent appliance in the associated appliance table, the judgment part 28 outputs the change information to the electricity calculation part 23 and image generation part 24. In this case, the process of calculating the second total electricity and the process of generating the second image information are the same as those of the aforementioned embodiment.

On the other hand, as the result of the above determination, when the same appliance ID as the change appliance ID is registered as a parent appliance in the associated appliance table, the judgment part 28 outputs the change information and the appliance ID of the appliance associated with the appliance ID of the parent appliance to the electricity calculation part 23 and image generation part 24. The process of calculating the second total electricity and the process of generating the second image information herein are sequentially described below.

First, the electricity calculation part 23 calculates the second total electricity based on the appliance ID of the associated appliances and the change information. A specific example of this calculation process is described below.

For example, the change appliance ID is the appliance ID indicating Appliance B (appliance 402); the change operating period information is information indicating the operating period (hereinafter, referred to as an operating period 54a, see FIG. 14) presented by the entire operating period image 54; and the changing process information is information indicating deletion. Moreover, the appliance ID of the associated appliance is assumed to be the appliance ID indicating Appliance C (appliance 403), for example.

In this case, the electricity calculation part 23 sets electricity consumption at the operating period 54a to zero in the electricity consumption represented by the first individual electricity information of the appliance 402. The first individual electricity information of the appliance 402 is thus updated to the second individual electricity information.

Figure 14:
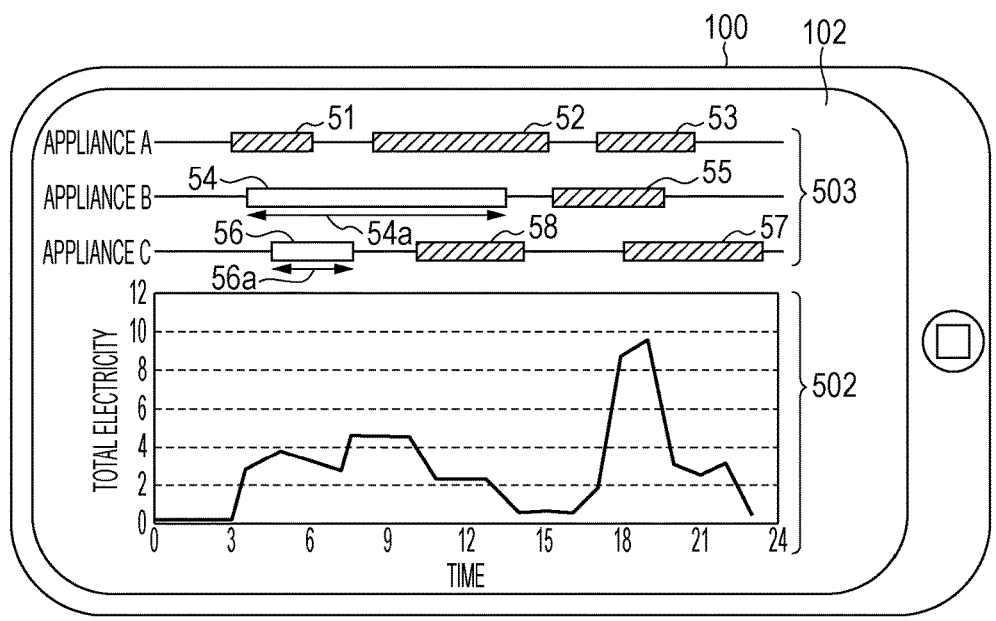
FIG. 14 is a view illustrating a display example of image information according to modification 7 of the embodiment.

Next, the electricity calculation part 23 specifies Appliance C by the appliance ID of the associated appliance. The electricity calculation part 23 specifies one of the operating periods of Appliance C that overlaps the operating period 54a by a predetermined period or more. As illustrated in FIG. 14, for example, the operating period 54a overlaps the operating period 56a by a predetermined period or more. The electricity calculation part 23 therefore specifies the operating period 56a.

Next, the electricity calculation part 23 sets the electricity consumption at the operating period 56a to zero in the electricity consumption represented by the first individual electricity information of the appliance 403. The first individual electricity information of the appliance 403 is thus updated to the second individual electricity information.

Next, as described in the embodiment above, the electricity calculation part 23 calculates the second total electricity based on the first total electricity, the difference between the second and first individual electricities of the appliance 402, and the difference between the second and first individual electricities of the appliance 403. The electricity calculation part 23 then outputs the second total electricity information to the image generation part 24.

Above is the description of the process of calculating the second total electricity. Next, the process of generating the second image information is described below.

The image generation part 24 generates the second image information based on the second total electricity information, the appliance ID of the associated appliance, and the change information. To be specific, the image generation part 24 generates the second total electricity image information based on the second total electricity information and generates the second operating period image information based on the appliance ID of the associated appliance and the change information. The process of generating the second total electricity image information is the same as that of the aforementioned embodiment, and the description thereof is omitted. The description below is given of a specific example of the process of generating the second operating period image information.

It is assumed that the change information and the appliance ID of the associated appliance are the same as those of the aforementioned specific example of the process of calculating the second total electricity, for example.

In this case, the image generation part 24 first erases the operating period image 54 presenting the operating period 54*a* of Appliance B (erases the operating period image 54 other than the outline, for example).

Next, in the same way as that in the aforementioned specific example of the process of calculating the second total electricity, the image generation part 24 specifies Appliance C by the appliance ID of the associated appliance and then specifies the operating period 56*a* of Appliance C, which overlaps the operating period 54*a* by a predetermined period or more.

Next, the image generation part 24 deletes the operating period image 56 presenting the operating period 56*a* of Appliance C (deletes the operating period image 56 other than the outline thereof, for example). The second operating period image 503 is thus generated.

Above is the description of the process of generating the second image information.

FIG. 14 illustrates a display example based on the second image information of Modification 7 generated as described above. FIG. 14 is a view illustrating an example of the second total electricity image and second operating period image (which are included in the second image information) displayed on the presentation unit 102 of the terminal device 100.

As illustrated in FIG. 14, the second total electricity image 502 and second operating period image 503 reflect the change of the operating period 54*a* of Appliance B specified by the user and the change of the operating period 56*a* of Appliance C, which is registered as the associated appliance of Appliance B. The second total electricity image 502 presents a time series of the total electricity of the electrical appliances installed in the group 10 when Appliance B is not operated during the operating period 54*a* and Appliance C is not operated during the operating period 56*a*. In the second operating period image 503, the operating period images 54 and 56 present only the outlines.

In FIG. 14, the arrows indicating the operating periods 54*a* and 56*a* are illustrated for convenience of explanation and are not displayed on the screen. In the example above, the case of deleting an operation period is described. However, Modification 7 is applicable to addition and moving of an operating period in a similar manner.

According to Modification 7, as described above, by previously setting appliances associated with a predetermined appliance (a parent appliance), it is possible to reflect not only the operating period of the appliance specified by the user but also the operating period of the associated appliance on the processes of calculating the second total electricity and generating the second image information. This can reduce the user operations to specify the operating periods that the user wants to change.

Modification 8

To make it easy for the user to specify an operating period on the display of the first image information, the display style of operating period images for the operating periods satisfying a predetermined condition may be changed in the first operating period image 501. An example thereof is described below.

When the image display execution request is received by the reception/transmission part 201, the image generation part 24 acquires the first individual electricity information (the sets of first individual electricity information of the appliances 401 to 403, for example) together with the first total electricity information from the electricity acquisition part 21.

Next, the image generation part 24 judges the magnitude of electricity consumption at each operating period based on the sets of first individual electricity information of the appliances 401 to 403 and the sets of first operation period information of the appliances 401 to 403. For example, the image generation part 24 specifies the electricity consumption represented by the first individual electricity information for each operating period represented by the first operating period information. Next, the image generation part 24 compares the specified electricity consumption with a predetermined threshold.

Figure 15:
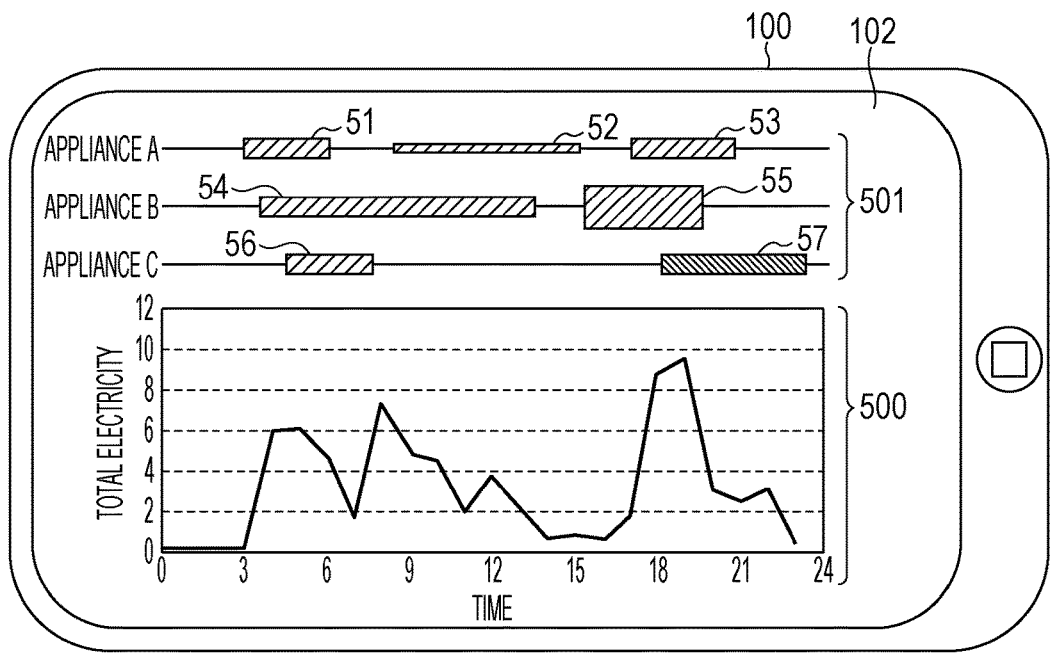
FIG. 15 is a view illustrating a display example of image information according to modification 8 of the embodiment.

As a result of the aforementioned comparison, the image generation part 24 generates a thinner operating period image for the operating period in which the electricity consumption is smaller than a threshold value. As illustrated in FIG. 15, for example, the operating period image 52 is thinner than normal thickness (the thickness of the operating period images 51, 53, 54, 56, and 57 in FIG. 15, for example).

On the other hand, as the result of the comparison, the image generation part 24 generates a thicker operating period image for the operating period in which the electricity consumption is larger than a second threshold (which is larger than the first threshold). As illustrated in FIG. 15, for example, the operating period image 55 is thicker than normal thickness (the thickness of the operating period images 51, 53, 54, 56, and 57 in FIG. 15, for example).

In the example illustrated in Modification 8, the thickness of each operating period image varies depending on the magnitude of electricity consumption. However, operating period images may have different texture patterns depending on the magnitude of electricity consumption. As illustrated in FIG. 15, for example, when the electricity consumption at the operating period of the operating period image 57 is smaller than the first threshold (or larger than the second threshold), the operating period image 57 may be displayed in a texture pattern different from a normal texture pattern (the texture pattern of the operating period images 51 to 56 in FIG. 15, for example.).

In the example illustrated in Modification 8, the display style (thickness or texture pattern) of each operating period image varies on the magnitude of the electricity consumption. However, the display style of each operating period image may be configured to vary depending on the operating mode. The operating mode is a dehumidification mode, a power-saving mode, or the like when the appliance is an air conditioner, for example. Operating mode information indicating the operating mode of each appliance may be included in the operating period information to be inputted to the image generation part 24, for example, or may be inputted into the image generation part 24 separately from the operating period information. In this case, the image generation part 24 determines the operating mode at each operating period based on the operating mode information and operating period information. The image generation part 24 generates each set of operating period image information by varying the display style thereof so that the user can identify the operating mode.

In Modification 8, the display style of each operating period image may be varied in accordance with preferentially turned-off appliance information. The preferentially turned-off appliance information includes an appliance ID (hereinafter, referred to a preferentially turned-off appliance ID) indicating an appliance whose power supply is preferentially turned off (in other words, the electricity consumption is set to zero), for example. The preferentially turned-off appliance IDs are registered by the user and stored in the storage 203, for example. In this case, the image generation part 24 searches the preferentially turned-off appliance IDs read from the storage 203 for the same ID as the appliance ID given to the first operating period information (for example, each set of first operating period information of the appliances 401 to 403, for example). When a preferentially turned-off appliance ID can be found, the image generating part 24 generates the operating period image information so that the display style of the operating period image of the appliance having the preferentially turned-off appliance ID is different from that of the other operating period images.

Figure 16:
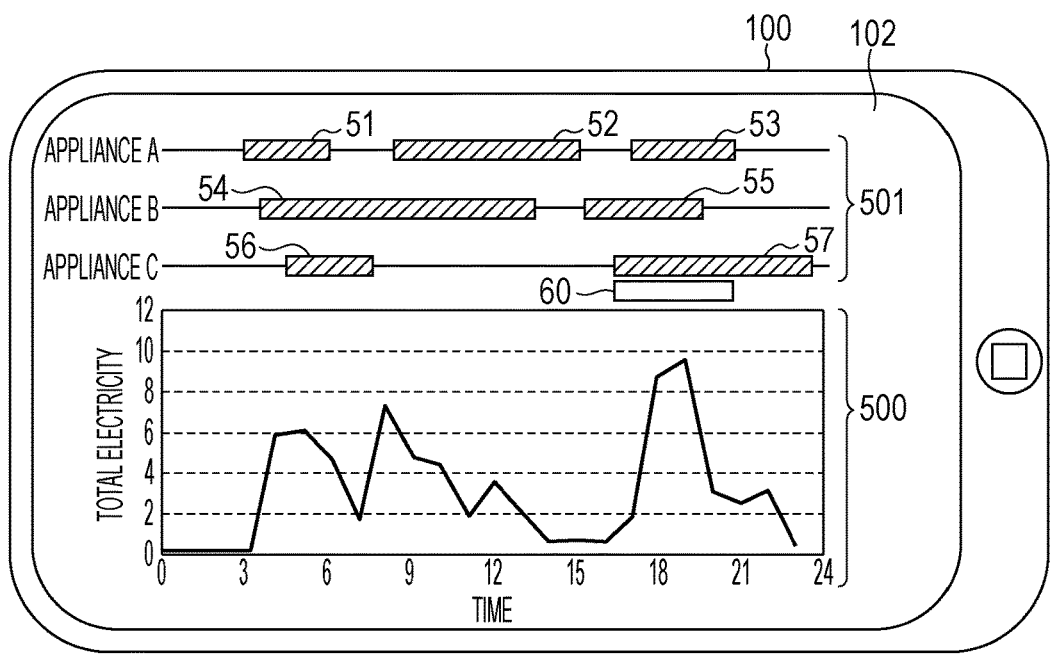
FIG. 16 is a view illustrating a display example of the image information according to modification 8 of the embodiment.

In Modification 8, the display style of each operating period image may be configured to vary on the result of comparison between the operating period and a standard operating period. The standard operating period is a typical operating period of a certain appliance. The standard operating period is an average of the operating periods collected from a third party (another user) who has used the certain appliance, for example. The information indicating the standard operating period (hereinafter referred to as a standard operating period information) is received from another server device (the cloud server 11*a* in FIG. 1A, for example) or is registered by an administrator of the server device 200 or the like and stored in the storage 203, for example. The standard operating period information is associated with an appliance ID. In this case, the image generation part 24 first reads the standard operating period information given the same ID as the appliance ID of the first operating period information. Next, the image generation part 24 determines for each appliance whether the ratio of each operating period of the first operating period information to the standard operating period of the standard operating period information is higher than a predetermined value (a previously set value). As illustrated in FIG. 16, for example, when the ratio of the operating period of the operating period image 57 to a standard operating period 60 is higher than a predetermined value, the image generation part 24 generates the operating period image 57 so that the thickness of the operating period image 57 is different from that of the other operating period images 51 to 56.

In FIG. 16, the standard operating period 60 is illustrated for convenience of explanation and is not displayed on the screen. In Modification 8, the aforementioned display style of operating period images is not limited to the thickness or texture pattern described above and may be color, shape, size, or an arbitrary combination of thickness, texture pattern, color, shape, and size, for example. In Modification 8, moreover, the display style of each operating period image may be configured to vary depending on the result of comparison between the operating period and a recommended operating period (see Modification 13 described later).

According to Modification 8, as described above, operating period images that are likely to be changed are displayed in a different display style from that of the other operating period images depending on the magnitude of the electricity consumption, operating mode, preferentially turned-off appliance information, the result of comparison between the operating period and standard operating period, or the like. The user can therefore easily specify the operating period that the user wants to change.

Modification 9

In the aforementioned embodiment, the user specifies the operating period that the user wants to change. However, the operating period to be changed may be determined by specifying the user's action. An example thereof is described below.

The storage 203 previously stores an action table. The action table includes information that associates user's actions with appliances which are turned off with the actions. Herein, user's action "being out of the home" is associated with the appliance ID of Appliance A, "an illumination in the living room" and the appliance ID of Appliance C, "an illumination in the kitchen". Such association of user's actions with the appliances may be registered by the user of the terminal device 100 or an administrator of the server 200, for example, or may be performed by the learning process described in Modification 8. The appliances associated with user's actions may be appliances whose operations are turned on with the user's action.

When the image display execution request is received by the transmitter/receiver 201, the image generation part 24 generates the first image information including information of an action setting image (hereinafter, referred to as action setting image information) in addition to the first total electricity image information and first operating period image information. The action setting image is an image used when the user performs an operation to specify an action and includes an action type image representing the type of action (being out of the house, for example) and a time axis image representing a straight line as a time axis. The first image information includes control information to control the terminal device 100 so that the first total electricity image, the first operating period image, and the action setting image are displayed together on the screen.

Figure 17A:
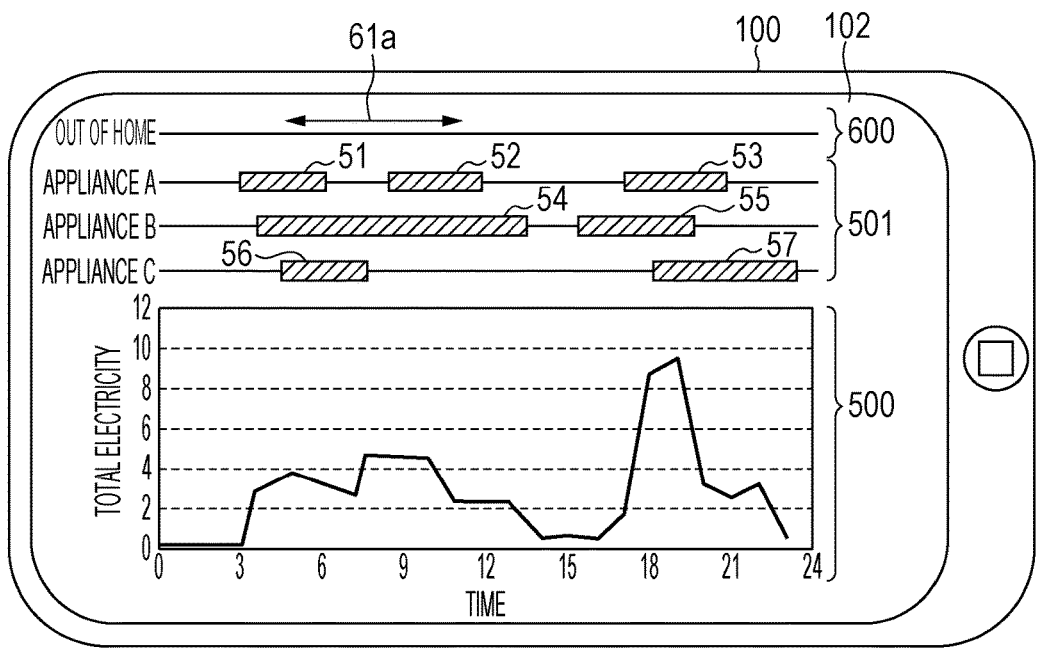
FIG. 17A is a view illustrating a display example of image information according to modification 9 of the embodiment.

FIG. 17A illustrates an example of the above-described first image information displayed on the presentation unit 102 of the terminal device 100.

As illustrated in FIG. 17A, an action setting image 600 is displayed above the first operating period image 501, for example. Herein, the user performs an operation to specify a time period (hereinafter, referred to as an action period) in which the user is out of the home. The user performs an operation of tracing a desired range of the displayed section of the time axis image in the action setting image 600, for example. It is assumed herein that the action period 61a is specified, for example.

Thereafter, the operating period change request is transmitted from the terminal device 100 to the server device 200. The request includes the action period information indicating an action period 61a and the action type information indicating "being out of the home" as the change information, for example.

When the operating period change request is received by the transmitter/receiver 201, the electricity calculation part 23 reads the action table from the storage 203 and specifies, in the action table, an appliance ID associated with "being out of the home" represented by the action type information. As an example, Appliance A (appliance 401) and Appliance C (appliance 403) are specified herein.

Next, the electricity calculation part 23 sets the electricity consumption within the range of the action period 61a represented by the action period information to zero in the electricity consumption represented by the first individual electricity information of the appliance 401 and the first individual electricity information of the appliance 403. The sets of first individual electricity information of the appliances 401 and 403 are thus updated to the sets of second individual electricity information of the appliances 401 and 403, respectively.

Next, as described in the above embodiment, the electricity calculation part 23 calculates the second total electricity based on the first total electricity, the difference between the second and first individual electricities of the appliance 401, and the difference between the second and first individual electricities of the appliance 403. The electricity calculation part 23 then outputs the second total electricity information to the image generation part 24. The electricity calculation part 23 also outputs the appliance IDs of specified Appliances A and C to the image generation part 24.

The image generation part 24 generates the second total electricity image information based on the second total electricity information as described in the above embodiment.

The image generation part 24 specifies operating periods among the operating periods of Appliances A and C corresponding to the action period 61a represented by the action period information. The image generation part 24 deletes the operating period image information corresponding to each specified operating period from the first operating period image information. The second operating period image information is thus generated.

The image generation part 24 generates the action setting image information including the information of the action period image (the action period image 61 in FIG. 17B, for example) presenting the action period 61a. The action setting image information is thus updated.

The image generation part 24 generates the second image information including the second total electricity image information, second operating period image information, and action setting image information updated. The image generation part 24 stores the generated second image information in the storage 203. The second image information includes the control information to control the terminal device 100 so that the second total electricity image 502, second operating period image 503, and updated action setting image 600 are displayed together on the screen.

By the control information, the second total electricity image 502, second operating period image 503, and updated action setting image 600 can be displayed together on the presentation unit 102 (display unit) of the terminal device 100, which is connected to the server device 200 via the network 300.

The image generation part 24 reads the second image information stored in the storage 203 and outputs the same to the transmitter/receiver 201. The second image information is transmitted to the terminal device 100 by the transmitter/receiver 201.

In the terminal device 100, thereafter, screen display based on the second image information is performed, and the second total electricity image 502, second operating period image 503, and updated action setting image 600 are simultaneously displayed on the presentation unit 102.

Figure 17B:
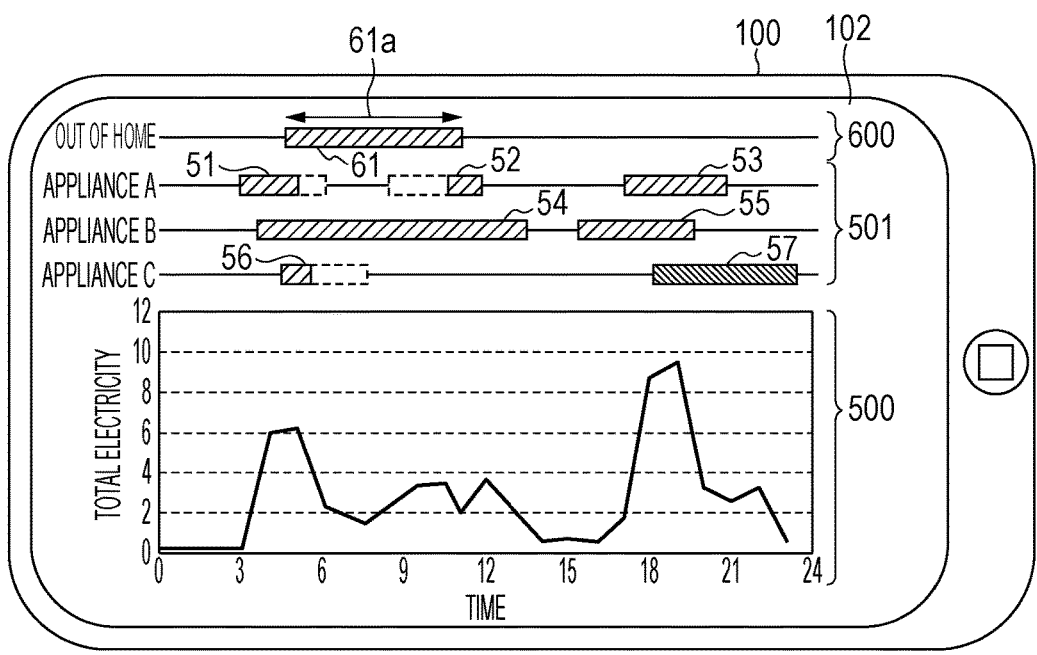
FIG. 17B is a view illustrating a display example of the image information according to modification 9 of the embodiment.

FIG. 17B illustrates a display example based on the second image information.

As illustrated in FIG. 17B, in the action setting image 600, the action period image 61 is superimposed and displayed at the position corresponding to the action period 61a on the time axis image, for example. In the second operating period image 503, the operating period images 51, 52, and 56 are partially erased. In other words, in the erased portions, only the outlines are displayed. The erased portions herein are periods within the range of the action period 61a.

In FIGS. 17A and 17B, the arrows indicating the action period 61a are illustrated for convenience of explanation and are not displayed on the screen. Above is the description of the example of deleting an operating period. However, Modification 9 is similarly applicable to adding or moving an operating period. The user may specify an action period after specifying the action type. The user may also specify plural action periods for each action type.

According to Modification 9, as described above, the operating periods are determined based on action periods specified by the user. This can reduce user's operations.

Modification 10

In the example described in the embodiment, the user performs an operation for the displayed section of each operating period image (the operating period images 51 to 57 in FIG. 5, for example) of the first operating period image 501. However, the user may perform an operation for the displayed section of the first total electricity image 500. An example thereof is described below.

Figure 18A:
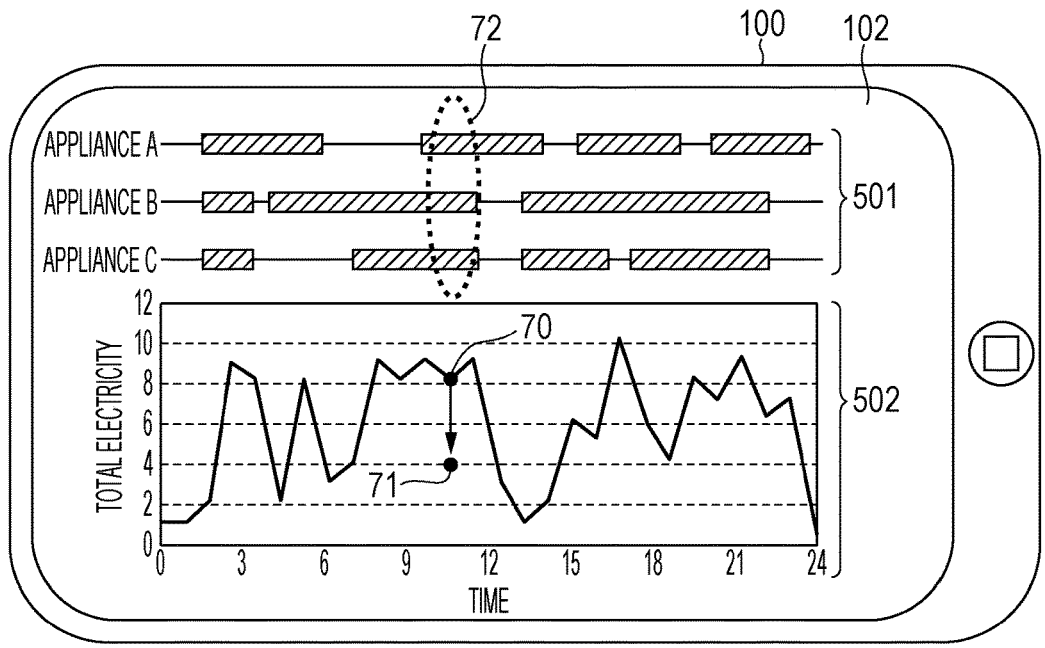
FIG. 18A is a view illustrating a display example of image information according to modification 10 of the embodiment.

For example, it is assumed that screen display based on the first image information is performed in the terminal device 100 and the first total electricity image and first operating period image are displayed on the presentation unit 102 of the terminal device 100 as illustrated in FIG. 18A. When the user wants to know a change in the total electricity and an appliance to be turned off in the case of changing the total electricity at a desired time, the user performs an operation to reduce a total electricity value 70 to a desired value 71 in the first total electricity image 500. For example, the user performs an operation of touching the displayed section of the total electricity value 70 with a finger and tracing the screen to a desired position below (the position indicating the desired value). The total electricity value 70 is a sum of electricity consumptions of Appliances A, B, and C, for example, as indicated by a circular region 72.

Thereafter, the operating period change request is transmitted from the terminal device 100 to the server device 200. As the change information, the request includes the appliance IDs of Appliances A to C, the changing process information indicating deletion of an operating period, change value information indicating the desired value 71, and time information indicating the time corresponding to the desired value 71, for example.

When the operating period change request is received by the transmitter/receiver 201, the electricity calculation part 23 calculates the second total electricity based on the change information included in the request, first individual electricity information, and first total electricity information. The electricity calculation part 23 sets the electricity consumption at the operating period of the specified appliance to zero (hereinafter, referred to as to turn off the specified appliance) so that the total electricity at the time represented by the time information becomes the closest to the desired value 71, for example. In this process, the electricity calculation part 23 may select the appliance to be turned off based on at least one of the sets of information including: the magnitude of the electricity consumption of each appliance, the magnitude of the accumulated electricity consumption during the operating period, and preferentially turned-off appliance information (see Modification 8). Moreover, the electricity calculation part 23 preferentially selects an operating period in which the appliance is to be turned off from the operating periods including the time indicated by the time information (operating periods presented by the operating period images partially included in the circular range 72 in FIG. 18A, for example). By the aforementioned setting, the predetermined first individual electricity information is updated to the second individual electricity information.

The electricity calculation part 23 outputs the second total electricity information indicating the calculated second total electricity, the change appliance ID indicating the appliance turned off in the above setting, and the change operating period information indicating the operating period when the appliance is turned off in the above setting to the image generation part 24.

The image generation part 24 generates the second total electricity image information based on the second total electricity image. In this process, the image generation part 24 generates the second total electricity image information so that the second total electricity image 502 is superimposed and displayed on the first total electricity image 500, for example.

The image generation part 24 generates the second operating period image information based on the change appliance ID and change operating period information.

Figure 18B:
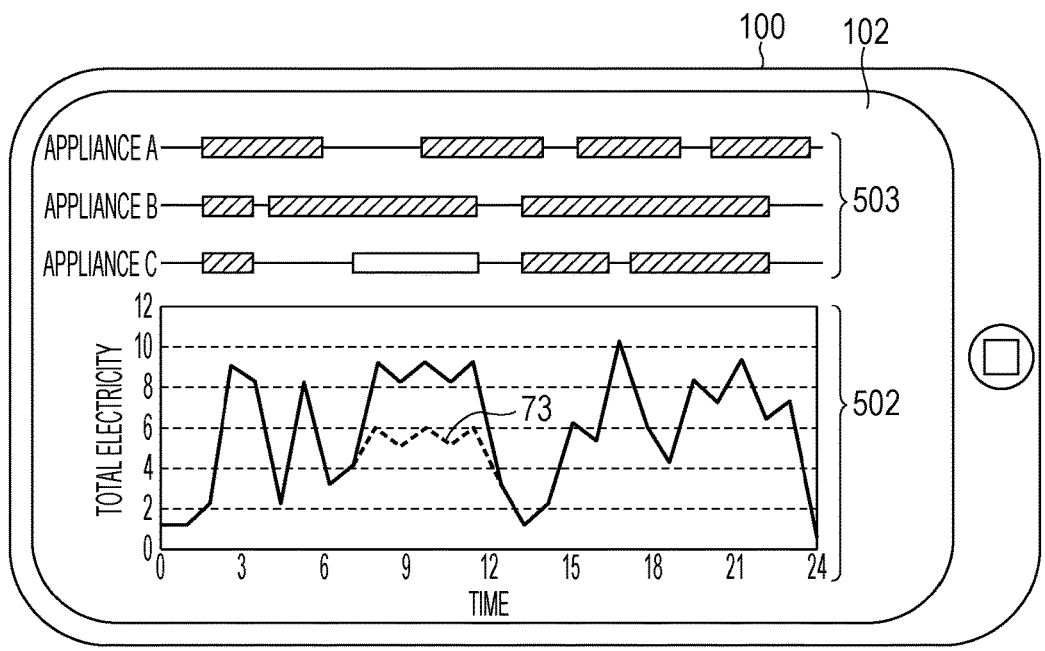
FIG. 18B is a view illustrating a display example of the image information according to modification 10 of the embodiment.

The aforementioned second total electricity image information and second operating period image information described above are transmitted to the terminal device 100 as the second image information and are displayed on the presentation unit 102. FIG. 18B illustrates a display example of the second image information. As illustrated in FIG. 18B, in the second operating period image 503, one of the operating periods of Appliance C (the operating period image representing the operating period in which the appliance is turned off) is displayed with only the outline.

In the second total electricity image 502, the graph presenting the second total electricity is superimposed and displayed on the graph presenting the first total electricity as illustrated in FIG. 18B. A section 73 of the graph presenting the second total electricity is a part different from the graph presenting the first total electricity and is presented by a dashed line, for example.

The section 73 of the graph may be displayed with a line of different color or thickness from the other part instead of the dashed line. In the example described above, the second total electricity image 502 is superimposed on the first total electricity image 500 as illustrated in FIG. 18B. However, the second total electricity image 502 may be displayed without being superimposed on the first total electricity image 500.

As illustrated in FIG. 18A, the arrow, the point indicating the total electricity value 70, the point indicating the desired value 71, and circular region 72 are illustrated for convenience of description and are not displayed on the screen. Moreover, above is the description of the case of reducing (deleting) the total electricity. However, Modification 10 is similarly applicable to the case of increasing (adding) the total electricity.

According to Modification 10, as described above, the user can know a change in the total electricity and the appliance to be turned off in the case of reducing the total electricity value at a desired time to a desired value.

Modification 11

In the example described in the above embodiment, the operating period images and total electricity image are displayed on the presentation unit 102 of the terminal device 100. However, the terminal device 100 may be configured to display an image representing electricity expenses. An example thereof is described below.

The storage 203 previously stores an electricity rate table. The electricity rate table includes information indicating unit rates of electricity (rate per 1 kWh, for example) for time periods of the day (the midnight period, morning and evening periods, and daytime period, for example).

A description below is given by assuming that electricity expenses are calculated by the electricity calculation part 23. However, the electricity expenses may be calculated by a not-illustrated electricity expense calculation part.

When the image display execution request is received by the transmitter/receiver 201, the electricity calculation part 23 receives the first total electricity information and the sets of first individual electricity information of the appliances 401 to 403 from the electricity acquisition part 21 and reads the electricity rate table from the storage 203.

Next, the electricity calculation part 23 calculates time-based electricity expenses (hereinafter, referred to as first time-based electricity expenses) of the day (24 hours), for example, based on the first total electricity represented by the first total electricity information and the unit rate of each period represented by the electricity rate table. The electricity calculation part 23 calculates the sum of the first time-based expenses (an electricity expense per day, for example; hereinafter, referred to as a first total electricity expense). The electricity expenses are calculated by a publicly-known technique, and the detail description thereof is omitted.

The electricity calculation part 23 outputs first electricity expense information indicating the first time-based electricity expenses and the first time-based total expense to the image generation part 24.

The image generation part 24 generates the first operating period image information based on the first operating period information as described in the above embodiment.

The image generation part 24 generates information (hereinafter, referred to as first time-based electricity expense image information) of a first time-based electricity expense image representing a time series of the first time-based electricity expenses of the first electricity expense information. The first time-based electricity expense image displayed based on the same information is a first time-based electricity expense image 510 in FIG. 19, for example.

The image generation part 24 generates information of a first total electricity expense image (hereinafter, referred to as first total electricity expense image information) presenting the first total electricity expense of the first electricity expense information. The first total electricity expense image displayed based on the same information is a first total electricity expense image 700 in FIG. 19, for example.

The image generation part 24 reads the electricity rate table from the storage 203 and generates information (hereinafter, referred to as time period image information) of time period images varying in display style on the respective time periods registered in the electricity rate table. The time period images displayed based on the same information are time period images 90 to 92 in FIG. 19, for example.

The image generation part 24 generates the first image information including the first operating period image information, first time-based electricity expense image information, first total electricity expense image information, pricing period image information. The image generation part 24 stores the generated first image information in the storage 203.

The first image information includes control information to control the terminal device 100 so that all of the aforementioned images are displayed together on the screen.

By the control information, all of the aforementioned images can be simultaneously displayed on the presentation unit 102 (display unit) of the terminal device 100, which is connected to the server device 200 via the network 300, to display.

The image generation part 24 reads the first image information stored in the storage 203 and outputs the first image information to the transmitter/receiver 201. The first image information is transmitted to the terminal device 100 by the transmitter/receiver 201.

In the terminal device 100, thereafter, screen display based on the first image information is performed, and the first operating period image information, first time-based electricity expense image information, first total electricity expense image information, and pricing period image information are displayed together on the presentation unit 102.

Figure 19:
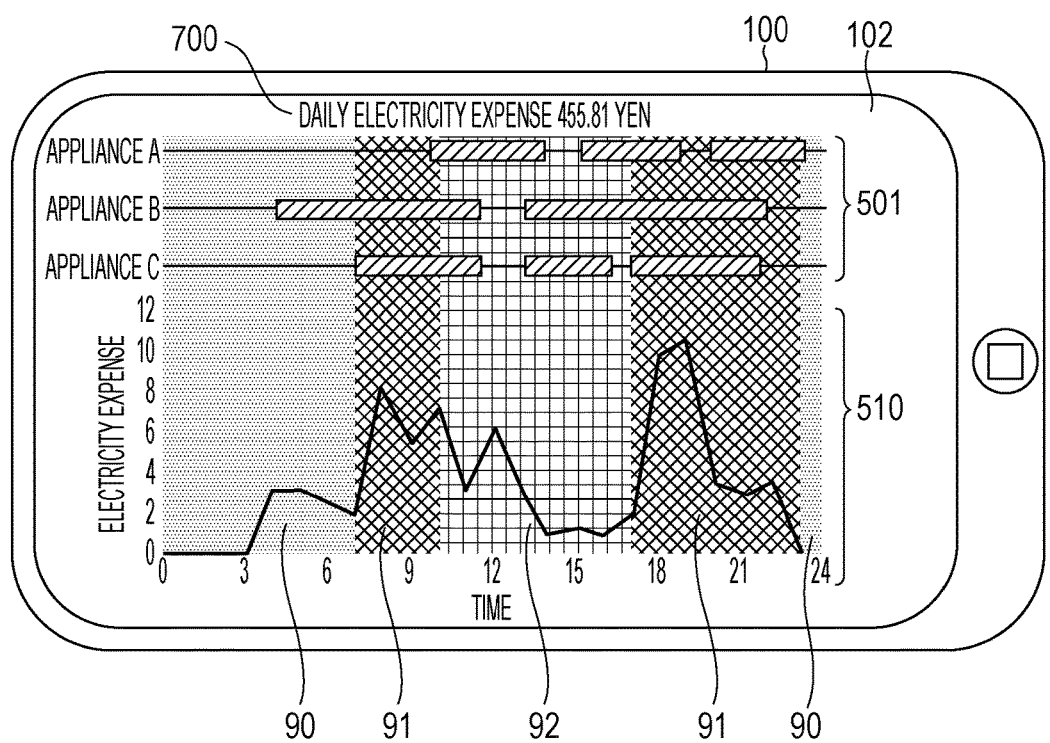
FIG. 19 is a view illustrating a display example of image information according to modification 11 of the embodiment.

FIG. 19 illustrates a display example of the screen display based on the first image information.

As illustrated in FIG. 19, the first total electricity expense image 700 is displayed above the first operating period image 501, and a first time-based electricity expense image 510 is displayed below the first operating time period image 501. The first total electricity expense image 700 presents the first total electricity expense in letters. The first time-based electricity expense image 510 is a graph with electricity expense (yen) on the vertical axis and time on the horizontal axis and presents a time series of the first time-based electricity expenses. The pricing period images 90 and 91 are superimposed and displayed on the first time-based electricity expense image 510 and first operating period image 501. The pricing period images 90 to 92 present the midnight period, morning and evening periods, and daytime period, respectively.

Herein, when the user performs an operation to give an instruction to delete the operating period represented by a desired operating period image in the first operating period image 501 (the operation described in the aforementioned embodiment, for example), for example, the change information indicating the instruction of the operation is transmitted from the terminal device 100 to the sever device 200 together with the operating period change request.

When the operating period change request is received by the transmitter/receiver 201, the electricity calculation part 23 calculates the second total electricity based on the change information and the like as described in the above embodiment. Next, the electricity calculation part 23 recalculates the time-based electricity expenses based on the second total electricity and electricity rate table. Hereinafter, the result of recalculation is referred to as second time-based electricity expenses. The electricity calculation part 23 then recalculates the total electricity expense based on the second time-based electricity expenses. Hereinafter, the result of recalculation is referred to as a second total electricity expense. The electricity calculation part 23 outputs second electricity expense information indicating the second time-based electricity expenses and second total electricity expense to the image generation part 24.

The image generation part 24 generates the second operating period image information based on the change information and the like as described in the above embodiment. The image generation part 24 generates information (hereinafter, referred to as second time-based electricity expense image information) of a second time-based electricity expense image representing a time series of the second time-based electricity expenses of the second electricity expense information. The image generation part 24 generates information (hereinafter, referred to as second total electricity expense image information) of a second total electricity expense image representing the second total electricity expense of the second electricity expense information. The image generation part 24 generates the second image information including the second operating period image information, second time-based electricity expense image information, and second total electricity expense image information. The second image information includes control information to control the terminal device 100 so that all the images described above are displayed together.

By the control information, all of the aforementioned images can be simultaneously displayed on the presentation unit 102 (display unit) of the terminal device 100, which is connected to the server device 200 via the network 300.

The image generation part 24 reads the second image information stored in the storage 203 and outputs the second image information to the transmitter/receiver 201. The second image information is transmitted to the terminal device 100 by the transmitter/receiver 201.

Thereafter, in the terminal device 100, screen display based on the second image information is performed, and the second operating period image information, second time-based electricity expense image information, and second total electricity expense image information are displayed together on the presentation unit 102 (not illustrated).

Figure 20A:
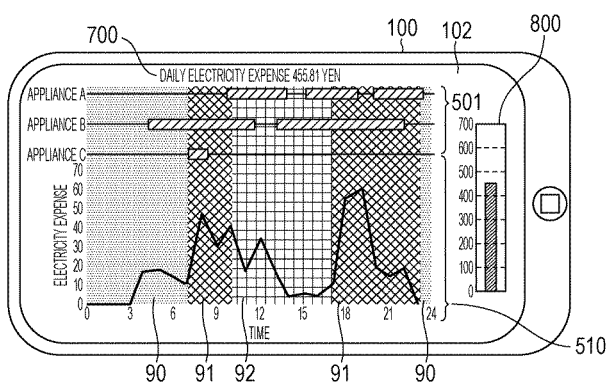
FIG. 20A is a view illustrating a display example of image information according to modification 12 of the embodiment.

Modification 11 may be configured so that the user can arbitrarily switch the display between the first time-based electricity expense image 510 illustrated in FIG. 20A and the first total electricity image 500 illustrated in FIG. 5, for example. Above is the description of the example of the case of deleting an operating period. However, Modification 11 is similarly applicable to adding and moving an operating period.

According to Modification 11, as described above, the user can know how the electricity expense (the time-based electricity expenses and total electricity expense) change when the user changes a certain operating period of a certain appliance.

Modification 12

In Modification 11, the user can know changes of the time-based electricity expenses and total electricity expense by specifying an operating period that the user wants to change. However, the system may be configured so that the user can know changes of the time-based electricity expenses and the appliance to be turned off when the total electricity expense is set to a desired value. An example thereof is described below. The description of the same portions as those of Modification 11 is omitted.

In the process of generating the first image information upon reception of the image display execution request by the transmitter/receiver 201, the image generation part 24 generates information (hereinafter, referred to as expense amount setting image information) of an expense amount setting image.

The expense amount setting image is an image used when the user performs an operation to specify a desired total electricity expense (a expense amount setting image 800 in FIG. 20A, for example). The expense amount setting image generated herein is referred to as a first expense amount setting image below.

Herein, the first expense amount setting image presents the first total electricity expense (455.81 yen in FIG. 19, for example).

The first image information includes information of the first expense amount setting image in addition to the images described in Modification 11. The first image information includes control information to control the terminal device 100 so that the images described in Modification 11 and the first expense amount setting image together on the screen.

By the control information, all of the aforementioned images can be simultaneously displayed on the presentation unit 102 (display unit) of the terminal device 100, which is connected to the server device 200 via the network 300.

The image generation part 24 reads the first image information stored in the storage 203 and transmits the first image information to the transmitter/receiver 201. The first image information is transmitted to the terminal appliance 100 by the transmitter/receiver 201.

In the terminal device 100, thereafter, screen display based on the first image information is performed, and all of the images described above are displayed simultaneously on the presentation unit 102.

FIG. 20A illustrates a display example based on the first image information. As illustrated in FIG. 20A, the first expense amount setting image 800 is displayed next to the first time-based electricity expense image 510. In the first expense amount setting image 800, the amount (455.81 yen, for example) presented in the first total electricity expense image 700 is displayed by a rectangular image. In the first expense amount setting image 800, moreover, plural amounts are displayed in letters.

When the user wants to know changes in the time-based electricity expense and an appliance to be turned off in the case of reducing the total electricity expense, the user performs an operation to reduce the expense amount presented by the first expense amount setting image 800 to a desired value (300 yen, for example). For example, the user performs an operation of touching the displayed section of the upper edge of the rectangular edge and tracing the screen to a desired position below (the position indicating the desired expense amount of 300 yen, for example).

Thereafter, the operating period change request is transmitted from the terminal device 100 to the server device 200. The request includes as the change information, the changing process information indicating deletion of an operating period and change value information indicating the specified expense amount, for example.

When the operating period change request is received by the transmitter/receiver 201, the electricity calculation part 23 calculates the second time-based electricity expenses based on the change information included in the request, first individual electricity information, first total electricity information, and electricity rate table. For example, the electricity calculation part 23 sets the electricity consumption at an operating period of the specified appliance to zero (hereinafter, referred to as to turn off the appliance) so that the total electricity becomes the closest to the specified expense amount represented by the change value information. In this process, the electricity calculation part 23 may select an appliance to be turned off based on at least one of the sets of information including: the magnitude of the electricity consumption of the appliance itself, the magnitude of accumulated electricity consumption during the operating period, and the preferentially turned-off appliance information (see Modification 8), for example. Alternatively, the electricity calculation part 23 may preferentially select the operating period in which the appliance is to be turned off from the operating periods including the peak time of the total electricity or the operating periods in the time period of high electricity rate. By the aforementioned setting, the second time-based electricity expense is calculated.

The electricity calculation part 23 outputs to the image generation part 24, the second electricity expense information indicating the second time-based electricity expense and second total electricity expense (or the specified expense amount), the change appliance ID indicating the appliance turned off in the above setting, and the change operating period information indicating the operating period in which the appliance is turned off in the above setting.

The image generation part 24 generates the second operating period image information based on the change appliance ID and change operating period information as described in the above embodiment.

The image generation part 24 generates the second time-based electricity expense image information based on the second time-based electricity expense of the second electricity expense information. The second time-based electricity expense image displayed based on the same information is a second time-based electricity expense image 512 in FIG. 20B, for example.

The image generation part 24 generates the second total electricity expense image information based on the second total electricity expense of the second electricity expense information. The second total electricity expense image displayed based on the same information is a second total electricity expense image 701 in FIG. 20B, for example.

The image generation part 24 generates information (hereinafter, referred to as second expense amount setting image information) of the second expense amount setting image based on the second total electricity expense of the second electricity expense information. The second expense amount setting image displayed based on the above information is a second expense amount setting image 801 in FIG. 20B, for example.

The image generation part 24 generates the second image information including the second operating period image information, second time-based electricity expense image information, second total electricity expense image information, and second expense amount setting image information. The second image information includes control information to control the terminal device 100 so that all of the images described above are displayed together on the screen.

By the control information, all of the aforementioned images can be simultaneously displayed on the presentation unit 102 (display unit) of the terminal device 100, which is connected to the server device 200 via the network 300.

The image generation part 24 reads the second image information stored in the storage 203 and outputs the second image information to the transmitter/receiver 201. The second image information is transmitted to the terminal appliance 100 by the transmitter/receiver 201.

In the terminal device 100, thereafter, screen display based on the second image information is performed, and all of the images described above are displayed together on the presentation unit 102.

Figure 20B:
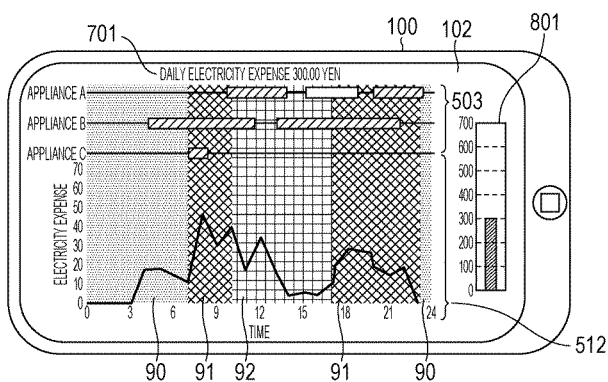
FIG. 20B is a view illustrating a display example of the image information according to modification 12 of the embodiment.

FIG. 20B illustrates a display example based on the second image information.

As illustrated in FIG. 20B, the second total electricity expense image 701 and second expense amount setting image 801 present the second total electricity expense (300 yen, for example). Moreover, the second time-based electricity expense image 512 presents a time series of the second time-based electricity expenses. In the second operating period image 503, one of the operating period images of Appliance A (an operating period image representing the operating period that Appliance A is turned off) presents only the outline.

Figure 20C:
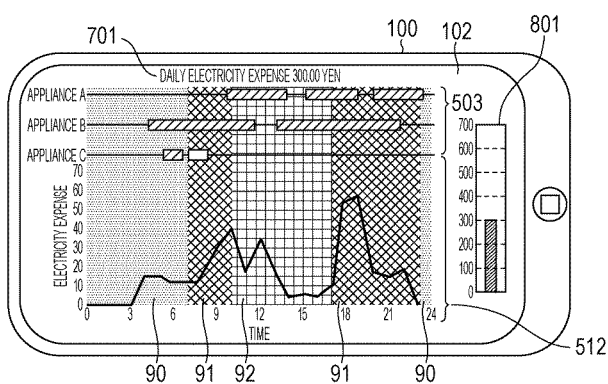
FIG. 20C is a view illustrating a display example of the image information according to modification 12 of the embodiment.

In the example described above, the image generation part 24 deletes the operating period of the specified appliance for calculating the second time-based electricity expense. However, the operating period of the specified appliance may be moved to the time period of lower electricity rate. For example, as illustrated in FIG. 20C, the operating period presented by the operating period image of the appliance C may be moved from one of the morning and evening periods 91 of high electricity rate to the midnight period 90 of low electricity rate.

The example described above illustrates a case of specifying reduction of the total electricity expense. However, Modification 12 is similarly applicable to the case of specifying an increase of the total electricity expense.

According to Modification 12, as described above, the user can know changes of the time-based electricity expenses and the appliance to be turned off when the total electricity expense is changed to a desired value.

Modification 13

The user may specify replacement of an operating period in addition to the aforementioned deletion (the embodiment, Modifications 1 and 2), addition (Modification 3), and moving (Modification 4) of an operating period.

The storage 203 previously stores replacement operating period information indicating an operating period for replacement (hereinafter, referred to as a replacement operating period). The replacement operating period information may be the standard operating period information described in Modification 8, the recommended operating period information, or both thereof, for example. The recommended operating period is an operating period recommended by an appliance maker developing and manufacturing the appliance (for example, the latest type appliance), for example. The recommended operating period information indicating the recommended operating period is stored in the storage 203 by an appliance maker or an administrator of the server device 200.

In the process of generating the first image information upon reception of the image display execution request by the transmitter/receiver 201, the image generation part 24 generates information (hereinafter, referred to as replacement operation period image information) of a replacement operating period image representing the replacement operating period and puts the generating information into the first image information.

The replacement operating period image is displayed as an option (a candidate image) when the first image information is displayed on the presentation unit 102 of the terminal device 100 and the terminal device 100 then receives a user's instruction to display the replacement operating period image. In this process, preferably, plural replacement operating period images having different lengths (operating periods) are displayed so that the user can select a desired period. The replacement operating period images have the same rectangular shape as that of the operating period image, for example.

The user performs operations to specify a desired operating period of a desired appliance (the change appliance, change operating period) and specify one of the replacement operating period images. An instruction specified by the operations is included in the operating period change request as the change information and is transmitted from the terminal device 100 to the server device 200. Thereafter, the information processor 202 performs the process of calculating the second total electricity and the process of generating the second image information based on the change information and the like as described in the above embodiment. Herein, calculation of the second total electricity employs the standard electricity consumption previously prepared as described in Modification 3, for example. For example, the electricity calculation part 23 deletes the electricity consumption of the desired operating period specified by the user and adds the deleted electricity consumption to the replacement operating period specified by the user to calculate the second individual electricity of the desired appliance. The electricity calculation part 23 uses the second individual electricity to calculate the second total electricity.

The second image information is then displayed on the presentation unit 102 of the terminal device 100. In this process, the replacement operating period image specified by the user is displayed on the time axis image of the desired appliance in the second operating period image 503. The second total electricity image 502 presents a time series of the second total electricity calculated by deleting the change operating period specified by the user and adding the replacement operating period specified by the user.

In the above description, the replacement operating period information is included in the first image information, but instead may be included in the second image information. This allows the user to specify the replacement operating period image for simulation again while the second image information is displayed.

According to Modification 13, as described above, the user can know a change of the total electricity when a desired operating period is replaced with the standard operating period or the operating period of the latest type appliance.

Modification 14

In the embodiment and modifications described above, the server device 200 includes the information processor 202, but the disclosure is not limited thereto. The information processor 202 may be included in the terminal device 100 or another device, for example.

Moreover, the terminal device 100 and server device 200 may be physically integrated. In this case, the presentation unit 102 and input unit 101 included in the terminal device 100 are included in the server device 200, for example, and the transmitter/receivers 104 and 201 included in the terminal and server devices 100 and 200 are not always necessary.

Modification 15

In the embodiment and modifications thereof, the electricity acquisition part 21 and operating period acquisition part 22 are configured to acquire the information or request received by the transmitter/receiver 201. However, the electricity acquisition part 21 and operating period acquisition part 22 may be configured to acquire information or requests from the terminal device 100, appliances 401 to 403, distribution board 404, relay device 410, or other not-illustrated devices, without using the transmitter/receiver 201. In the embodiment and modifications thereof, the electricity acquisition part 21 and operating period acquisition part 22 are provided separately from the transmitter/receiver 201. However, the transmitter/receiver 201 may be configured to serve as both the parts described above. In the embodiment and modifications thereof, the electricity acquisition part 21 and operating period acquisition part 22 may be integrated.

Above is the description of the modifications of the embodiment. The modifications may be arbitrarily combined.

<Example Implemented by Computer Program>

The embodiment according to the disclosure is described above in detail with reference to the drawings. The functions of the aforementioned terminal device 100, appliances 401 to 403, distribution board 404, relay device 410, and server device 200 (hereinafter, referred to as devices) can be implemented by a computer program.

Figure 21:
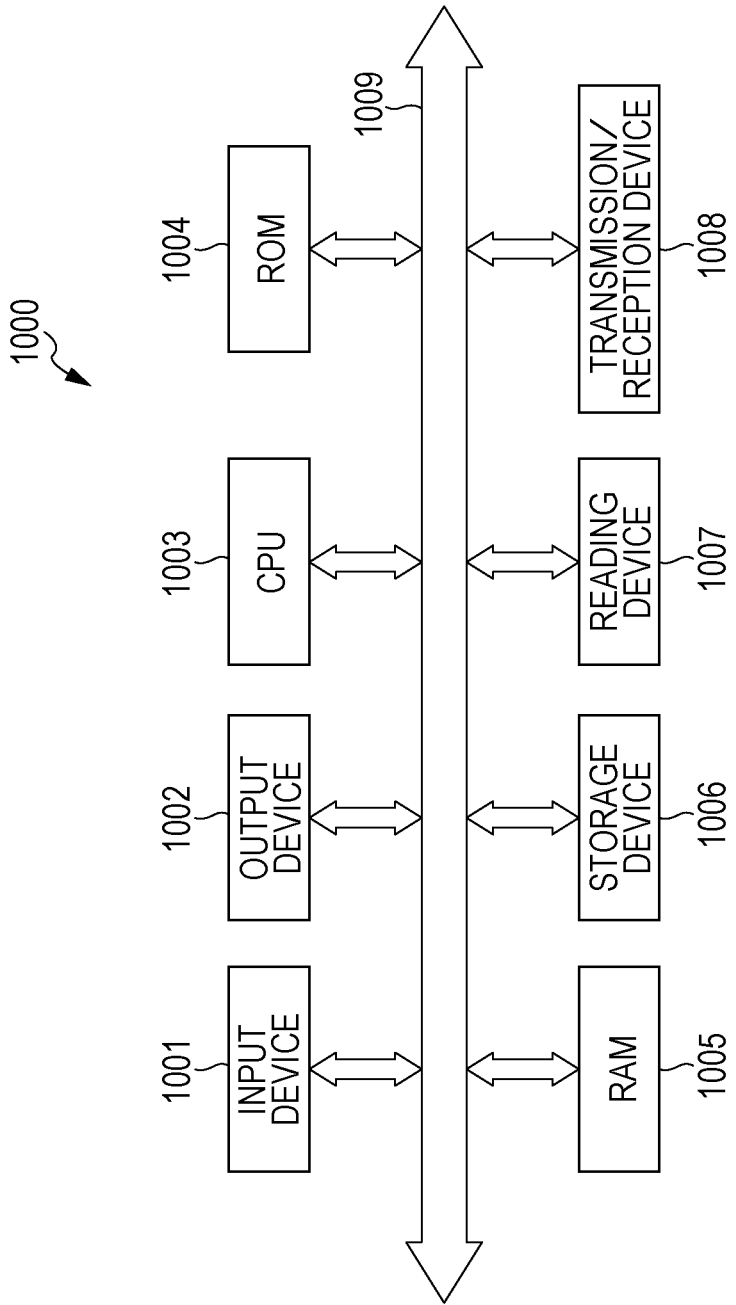
FIG. 21 is a diagram illustrating an example of the hardware configuration of a computer which uses software to implement functions of a terminal device and a server device according to the embodiment.

FIG. 21 is a diagram illustrating a hardware configuration of a computer that implements the functions of the aforementioned devices with a program. A computer 1000 includes an input device 1001 such as input buttons or a touch pad, an output device 1002 such as a display or a speaker, a CPU (central processor) 1003, a ROM (read only memory) 1004, a RAM (random access memory) 1005, a storage device (a hard disk device and a SSD (solid state drive)) 1006, a reading device 1007 reading information from a recording medium such as a DVD-ROM (digital versatile disk read only memory) or a USB (universal serial bus) memory, and a transmission/reception device 1008 performing communication via a network. The devices are connected through a bus 1009.

The reading device 1007 reads a program that implements the functions of the aforementioned devices from a recording medium storing and stores the program in the storage device 1006. Alternatively, the transmission/reception device 1008 communicates with the server device connected to the network, downloads a program implementing the functions of the aforementioned devices from the server device, and stores the program in the storage device 1006.

The CPU 1003 implements the function of each portion by copying the program stored in the storage device 1006 to the RAM 1005 and sequentially reading instructions included in the program from the RAM 1005 for execution. In the process of executing the program, the information obtained in the various processes described in the embodiment and modifications is stored in the RAM 1005 or storage device 1006 and is properly used.

<Type of Cloud Service>

The technique described in the embodiment above can be implemented in the following types of cloud services, for example. However, the service types in which the technique described in the above embodiment can be implemented are not limited to these types.

(Service Type 1: House Data Center Type)

Figure 22:
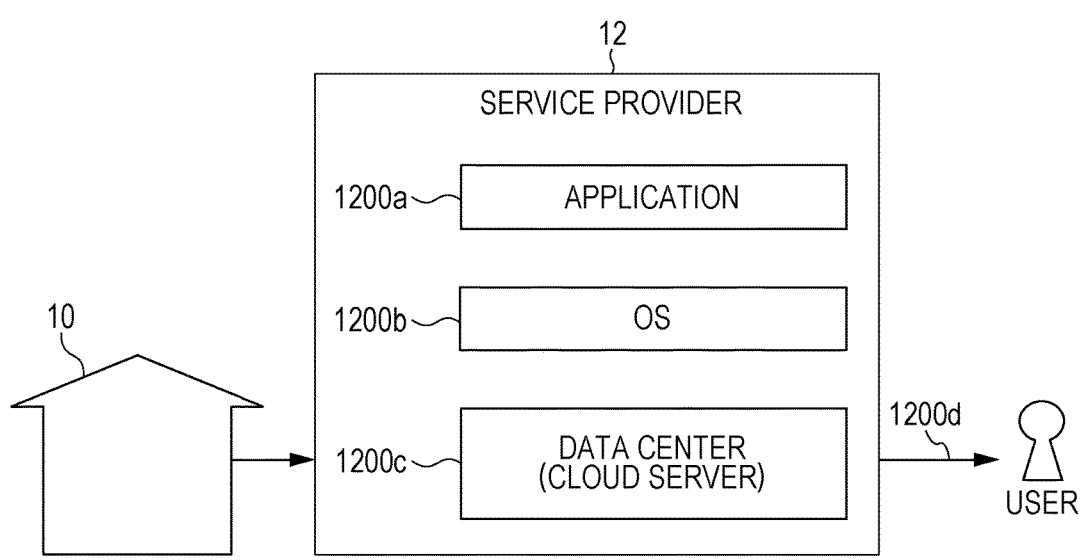
FIG. 22 is a diagram illustrating service type 1 (in-house data center type)

FIG. 22 is a diagram illustrating service type 1 (house data center type). In service type 1, the service provider 12 acquires information from the group 10 and provides services to the user. In service type 1, the service provider 12 includes the function of the data center operating company. In other words, the service provider holds the cloud server 11a managing big data. Accordingly, the data center operating company does not exist.

In service type 1, the service provider 12 operates and manages a data center (the cloud server 11a) (1200c). The service provider 12 manages the OS (1200b) and applications (1200a). The service provider 12 provides services by using the OS (1200b) and applications (1200a) managed by the service provider 12 (1200d).

(Service Type 2: IaaS Type)

Figure 23:
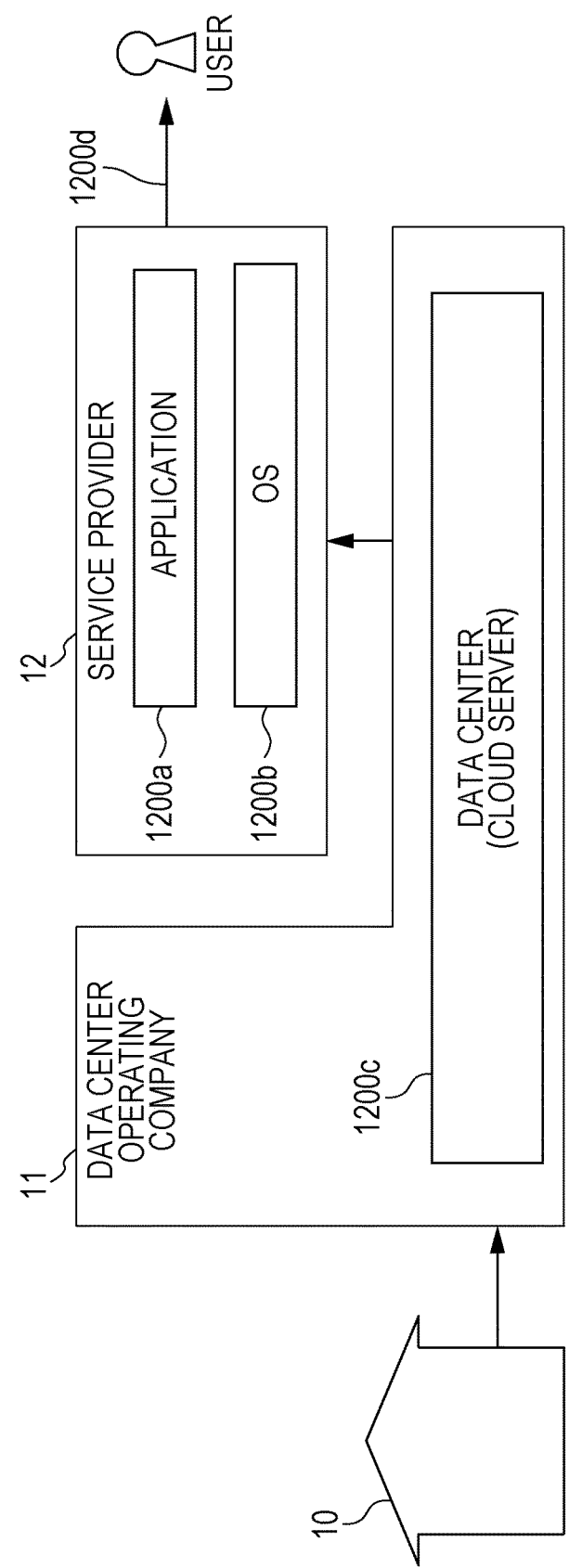
FIG. 23 is a diagram illustrating service type 2 (IaaS type)

FIG. 23 is a diagram illustrating service type 2 (IaaS type). The IaaS is an abbreviation for Infrastructure as a service and is a cloud service providing model that provides as a service via the Internet, an infrastructure itself for constructing and operating a computer system.

In service type 2, the data center operating company operates and manages a data center (the cloud server 11a) (1200c). The service provider 12 manages the OS (1200b) and applications (1200a). The service provider 12 provides services by using the OS (1200b) and applications (1200a) managed by the service provider 12 (1200d).

(Service Type 3: PaaS Type)

Figure 24:
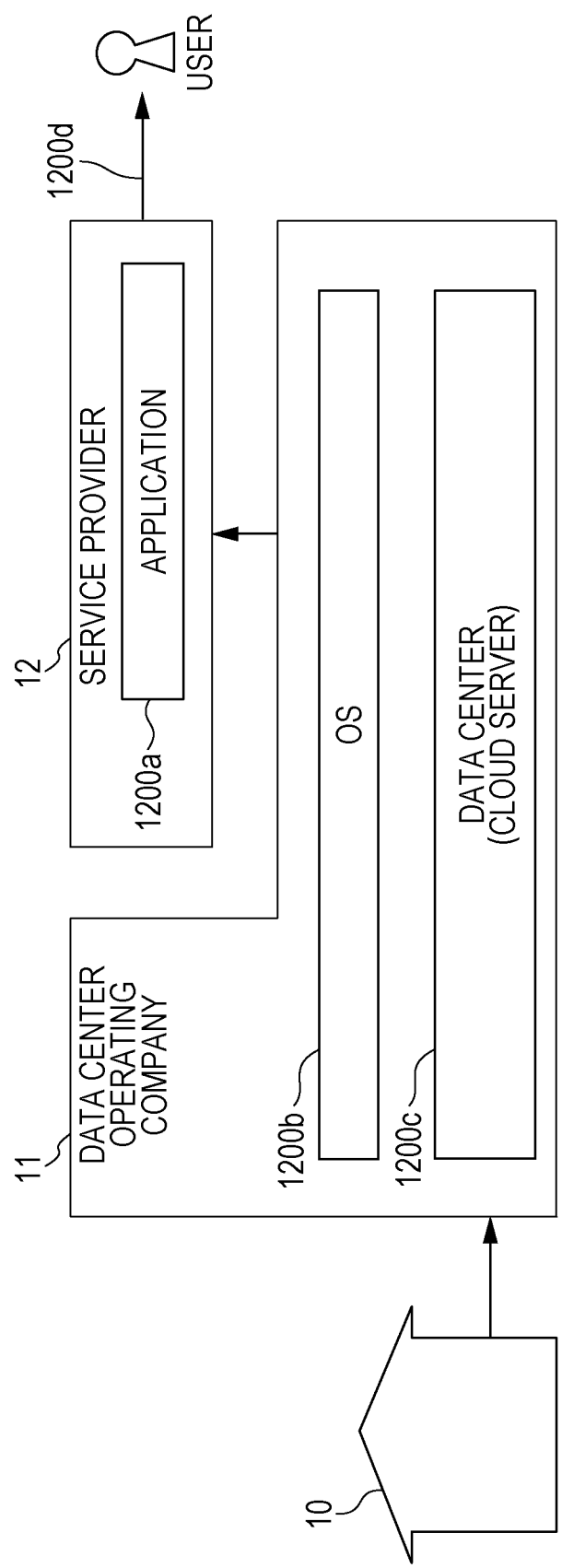
FIG. 24 is a diagram illustrating service type 3 (PaaS type)

FIG. 24 is a diagram illustrating service type 3 (PaaS type). The PaaS is an abbreviation for Platform as a service and is a cloud service providing model that provides as a service via the Internet, a platform as a base for constructing and operating software.

In service type 3, the data center operating company 11 operates and manages the OS (1200b) and a data center (the cloud server 11a) (1200c). The service provider 12 manages the applications (1200a). The service provider 12 provides services by using the OS (1200b) managed by the data center operating company and the applications (1200a) managed by the service provider 12 (1200d).

(Service Type 4: SaaS Type)

FIG. 25 is a diagram illustrating service type 4 (SaaS type). The SaaS is an abbreviation for Software as a service. The SaaS is a cloud service providing model which has a function of allowing a company or an individual (user) not holding a data center (a cloud server) to use via a network such as the Internet, applications provided by a platform provider who holds a data center (cloud server), for example.

In service type 4, the data center operating company 11 manages applications (1200a), manages the OS (1200b), and operates and manages a data center (the cloud server 11a) (1200c). The service provider 12 provides services by using the OS (1200b) and applications (1200a) managed by the data center operating company 11 (1200d).

In any of the service types, the service provider 12 is considered to provide services. Moreover, the service provider or data center operating company may develop the OS, applications, databases of big data, and the like by themselves or outsource such development to a third party.

The disclosure is suitable for an information presentation apparatus, an information presentation method, and a non-transitory recording medium storing a computer program, where the information presentation apparatus and method and the recording medium storing the computer program provide information on electricity consumption of electrical appliances to the user.

What is claimed is:

1. An information presentation apparatus, comprising:
a storage which stores first image information; and
a processor which reads the first image information from the storage and executes a first screen display based on the first image information,
wherein after executing the first screen display, the processor
generates second image information based on an operation by a user,
stores the generated second image information in the storage, and
executes a second screen display based on the second image information read from the storage,
wherein the execution of the first screen display includes a process of displaying, as a graphical user interface (GUI), a first total electricity image and first operating period images together on a display, wherein the first total electricity image represents a first graph indicating a change of total electricity consumption of appliances over time in a predetermined time period, wherein the appliances are installed in a predetermined area, and wherein the first operating period images indicate operating periods for each of the appliances for the predetermined time period, and the first operating period images for each appliance are shown on separate lines parallel to a time axis of the first graph,
wherein the operation by the user is an operation to change at least one of the operating periods by (i) changing, along a direction parallel to a time axis of the first graph, a position of at least one of the first operating period images corresponding to the at least one of the operating periods, or (ii) changing a length of the at least one of the first operating period images, the length being a length of the direction, and
the execution of the second screen display includes a process of displaying, as the GUI, a second total electricity image and second operating period images together on the display, wherein the second total electricity image represents a second graph indicating the change of the total electricity consumption over time updated from the first graph based on the operation by the user, and wherein the second operating period images are the first operating period images, at least one of which is updated based on the change of the at least one of the operating periods,
wherein the execution of the first screen display includes the process of displaying, as the GUI, both of the first graph indicating the change of the total continuous electricity consumption of the appliances with time axis, and a first chart indicating the operating periods for each of the appliances on the separate lines while sharing the time axis with the first graph, and
the execution of the second screen display includes the process of displaying, as the GUI, both of the second graph indicating the simulated change of the total continuous electricity consumption of the appliances updated from the first graph with the time axis, and a second chart indicating new operating periods at least partly updated from the operating periods on the separate lines while sharing the time axis with the second graph.

2. The information presentation apparatus according to claim 1, further comprising:
a transmitter which transmits the first image information and the second image information via a network to a terminal provided with the display,
wherein the information presentation apparatus
causes the terminal to execute the first screen display based on the transmitted first image information,
transmits the second image information to the terminal, and
causes the terminal to execute the second screen display based on the transmitted second image information.

3. The information presentation apparatus according to claim 2, further comprising:
a receiver which receives information based on the operation by the user on a touch panel included in the terminal.

4. The information presentation apparatus according to claim 1, further comprising:
a generator which generates information for the first total electricity image based on total electricity information indicating the time series of the total electricity consumption of the appliances in the predetermined time period and generates information for the first operating period images based on operating period information indicating the operating periods for each of the appliances in the predetermined time period; and
a calculator which, when the at least one of the operating periods is changed based on the operation by the user on a terminal which is connected to the information presentation apparatus via a network, updates the total electricity information based on change information indicating the change of the at least one of the operating periods and individual electricity information indicating a time series of electricity consumption of each of the appliances in the predetermined time period,
wherein the generator generates information for the second total electricity image based on the updated total electricity information and generates information for the second operating period images based on the change information and the operating period information, and
the processor
generates the first image information including the generated information for the first total electricity image and the generated information for the first operating period images, and stores the generated first image information in the storage, and
generates the second image information including the generated information for the second total electricity image and the generated information for the second operating period images, and stores the generated second image information in the storage.

5. The information presentation apparatus according to claim 4,
wherein when an operating period of a first appliance is changed based on the operation by the user on the terminal, the calculator determines an operating period of a second appliance based on the operating period of the first appliance, the second appliance previously registered as an appliance associated with the first appliance, and updates the total electricity consumption based on information of the operating period of the first appliance, information of the operating period of the second appliance, the individual electricity information, and the total electricity information, and the generator generates information for the second continuous total electricity image based on the updated total electricity information, and generates information for the second operating period images based on the information of the operating period of the first appliance, the information of the operating period of the second appliance, and the operating period information.

6. The information presentation apparatus according to claim 4, wherein when an operation, to specify an action of the user and a period of the action, is performed by the user on the terminal, the calculator determines an operating period of a third appliance, which is previously registered as an appliance associated with the action of the user, based on the period of the action, and updates the total electricity consumption based on information of the operating period of the third appliance, the individual electricity information, and the total electricity information, and the generator
generates the information for the second total electricity image based on the updated total electricity information and generates the information for the second operating period images based on the information of the operating period of the third appliance and the operating period information.

7. The information presentation apparatus according to claim 4, wherein based on at least one kind of information among information on magnitude of the electricity consumption of the appliances, information on operating modes of the appliances, information on an appliance previously registered as one to be preferentially turned off, and information on a previously registered standard or recommended operating period of each appliance, the generator generates the information for the first operating period images such that a predetermined image in the first operating period images is displayed in a different style from the other images in the first operating period images.

8. The information presentation apparatus according to claim 4, wherein the execution of the first screen display includes a process of causing the display included in the terminal to display, as the GUI, a candidate image selectable by an operation of the user, the candidate image is at least one of an image representing a previously-registered standard operating period of each appliance and a previously-registered operating period recommended for the appliance, the calculator updates the total electricity consumption based on information of the operating period of the candidate image selected by the operation of the user on the terminal, the change information, the individual electricity information, and the total electricity information, and the generator generates the information for the second total electricity image based on the updated total electricity information, and generates the information for the second operating period images based on the operating period of the candidate image selected by the operation of the user on the terminal, the change information, and the operating period information.

9. The information presentation apparatus according to claim 1, wherein the storage includes a memory, and
the processor includes a processing circuit.

10. The information presentation apparatus according to claim 1, wherein the first chart is a first bar chart in which the appliances is listed in a vertical direction, and in which first bars, as the first operating periods images, each are arranged along the time axis extending in a horizontal direction, and the second chart is a second bar chart in which the appliances is listed in the vertical direction, and in which second bars, as the second operating periods images, each are arranged along the time axis.

11. The information presentation apparatus according to claim 10, wherein the first graph and the second graph each are line graph of which a vertical axis indicates the total electricity consumption, and of which a horizontal axis is the time axis.

12. The information presentation apparatus according to claim 1, wherein the second graph indicates simulation of the change of the total electricity consumption on assumption that the at least one of the operating periods is changed as instructed in the operation by the user.

13. An information presentation method, comprising:
storing first image information in a storage;
reading the first image information from the storage to execute a first screen display based on the first image information;
after executing the first screen display, generating second image information based on an operation by a user;
storing the generated second image information in the storage; and
executing a second screen display based on the second image information read from the storage,
wherein the execution of the first screen display includes a process of displaying, as a graphical user interface (GUI), a first total electricity image and first operating period images together on a display of a terminal, wherein the first total electricity image represents a first graph indicating a change of total electricity consumption of appliances over time in a predetermined time period, wherein the appliances are installed in a predetermined area, and wherein the first operating period images indicate operating periods for each of the appliances in the predetermined time period, and the first operating period images for each appliance are shown on separate lines parallel to a time axis of the first graph,
wherein the operation by the user is an operation to change at least one of the operating periods by (i) changing, along a direction parallel to a time axis of the first graph, a position of at least one of the first operating period images corresponding to the at least one of the operating periods, or (ii) changing a length of the at least one of the first operating period images, the length being a length of the direction, and
the execution of the second screen display includes a process of displaying, as the GUI, a second total electricity image and second operating period images together on the display, wherein the second total electricity image represents a second graph indicating the change of the total electricity consumption over time updated from the first graph based on the operation by the user, and wherein the second operating period images are the first operating period images, at least one of which is updated based on the change of the at least one of the operating periods, wherein the execution of the first screen display includes the process of displaying, as the GUI, both of the first graph indicating the change of the total continuous electricity consumption of the appliances with time axis, and a first chart indicating the operating periods for each of the appliances on the separate lines while sharing the time axis with the first graph, and the execution of the second screen display includes the process of displaying, as the GUI, both of the second graph indicating the simulated change of the total continuous electricity consumption of the appliances updated from the first graph with the time axis, and a second chart indicating new operating periods at least partly updated from the operating periods on the separate lines while sharing the time axis with the second graph.

14. A non-transitory computer-readable recording medium storing a computer program, the computer program causing a computer to:

store first image information in a storage;

read the first image information from the storage to execute a first screen display based on the first image information;

generate second image information based on an operation by a user after executing the first screen display;

store the generated second image information in the storage; and execute a second screen display based on the second image information read from the storage, wherein the execution of the first screen display includes a process of displaying, as a graphical user interface (GUI), a first total electricity image and first operating period images together on a display of a terminal, wherein the first total electricity image represents a first graph indicating a change of total electricity consumption of appliances over time in a predetermined time period, wherein the appliances are installed in a predetermined area, and wherein the first operating period images indicate operating periods for each of the appliances in the predetermined time period, and the first operating period images for each appliance are shown on separate lines parallel to a time axis of the first graph, wherein the operation by the user is an operation to change at least one of the operating periods by (i) changing, along a direction parallel to a time axis of the first graph, a position of at least one of the first operating period images corresponding to the at least one of the operating periods, or (ii) changing a length of the at least one of the first operation period images, the length being a length of the direction, and the execution of the second screen display includes a process of displaying, as the GUI, a second total electricity image and second operating period images together on the display, wherein the second total electricity image represents a second graph indicating the change of the total electricity consumption over time updated from the first graph based on the operation by the user, and wherein the second operating period images are the first operating period images, at least one of which is updated based on the change of the at least one of the operating periods, wherein the execution of the first screen display includes the process of displaying, as the GUI, both of the first graph indicating the change of the total continuous electricity consumption of the appliances with time axis, and a first chart indicating the operating periods for each of the appliances on the separate lines while sharing the time axis with the first graph, and the execution of the second screen display includes the process of displaying, as the GUI, both of the second graph indicating the simulated change of the total continuous electricity consumption of the appliances updated from the first graph with the time axis, and a second chart indicating new operating periods at least partly updated from the operating periods on the separate lines while sharing the time axis with the second graph.

15. An information presentation method, comprising:

based on first image information read from a storage, executing a first screen display to display, as a graphical user interface (GUI), a first total electricity image and first operating period images together on a display, wherein the first total electricity image represents a first graph indicating a change of total electricity consumption of appliances over time in a predetermined time period, wherein the appliances are installed in a predetermined area, and wherein the first operating period images indicate operating periods for each of the appliances in the predetermined time period; and the first operating period images for each appliance are shown on separate lines parallel to a time axis of the first graph;

reading from the storage, second image information generated based on an operation of a user after execution of the first image display, wherein the operation by the user is an operation to change at least one of the operating periods by (i) changing, along a direction parallel to a time axis of the first graph, a position of at least one of the first operating period images corresponding to the at least one of the operating periods, or (ii) changing a length of the at least one of the first operating period images, the length being a length of the direction; and executing a second screen display to display, as the GUI, a second total electricity image and second operating period images together on the display based on the second image information, wherein the second total electricity image represents a second graph indicating the change of the total electricity consumption over time updated from the first graph based on the operation by the user, and wherein the second operating period images are the first operating period images, at least one of which is updated based on the change of the at least one of the operating periods, wherein the execution of the first screen display includes the process of displaying, as the GUI, both of the first graph indicating the change of the total continuous electricity consumption of the appliances with time axis, and a first chart indicating the operating periods for each of the appliances on the separate lines while sharing the time axis with the first graph, and the execution of the second screen display includes the process of displaying, as the GUI, both of the second graph indicating the simulated change of the total continuous electricity consumption of the appliances updated from the first graph with the time axis, and a second chart indicating new operating periods at least partly updated from the operating periods on the separate lines while sharing the time axis with the second graph.

16. A non-transitory computer-readable recording medium storing a computer program, the computer program causing a computer to:

based on first image information read from a storage, execute a first screen display to display, as a graphical user interface (GUI), a first total electricity image and first operating period images together on a display, wherein the first total electricity image represents a first graph indicating a change of total electricity consumption of appliances over time in a predetermined time period, wherein the appliances are installed in a predetermined area, and wherein the first operating period images indicate operating periods for each of the appliances in the predetermined time period; and the first operating period images for each appliance are shown on separate lines parallel to a time axis of the first graph, read from the storage, second image information generated based on an operation of a user after the execution of the first image display, wherein the operation by the user is an operation to change at least one of the operating periods by (i) changing, along a direction parallel to a time axis of the first graph, a position of at least one of the first operating period images corresponding to the at least one of the operating periods, or (ii) changing a length of the at least one of the first operation period images, the length being a length of the direction; and execute a second screen display to display, as the GUI, a second total electricity image and second operating period images together on the display based on the second image information, wherein the second total electricity image represents a second graph indicating the change of the total electricity consumption over time updated from the first graph based on the operation by the user, and wherein the second operating period images are the first operating period images, at least one of which is updated based on the change of the at least one of the operating periods, wherein the execution of the first screen display includes the process of displaying, as the GUI, both of the first graph indicating the change of the total continuous electricity consumption of the appliances with time axis, and a first chart indicating the operating periods for each of the appliances on the separate lines while sharing the time axis with the first graph, and the execution of the second screen display includes the process of displaying, as the GUI, both of the second graph indicating the simulated change of the total continuous electricity consumption of the appliances updated from the first graph with the time axis, and a second chart indicating new operating periods at least partly updated from the operating periods on the separate lines while sharing the time axis with the second graph.

17. An information presentation apparatus, comprising:

a generator which, based on first image information read from a storage, executes a first screen display to display, as a graphical user interface (GUI), a first total electricity image and first operating period images together on a display, wherein the first total electricity image represents a first graph indicating a change of total electricity consumption of appliances over time in a predetermined time period, wherein the appliances are installed in a predetermined area, and wherein the first operating period images indicate operating periods for each of the appliances for the predetermined time period; and the first operating period images for each appliance are shown on separate lines parallel to a time axis of the first graph, a reader which reads from the storage, second image information generated based on an operation of a user after execution of the first image display, wherein the operation by the user is an operation to change at least one of the operating periods by (i) changing, along a direction parallel to a time axis of the first graph, a position of at least one of the first operating period images corresponding to the at least one of the operating periods, or (ii) changing a length of the at least one of the first operation period images, the length being a length of the direction; and an executor which executes a second screen display to display, as the GUI, a second total electricity image and second operating period images together on the display based on the second image information, wherein the second total electricity image represents a second graph indicating the change of the total electricity consumption over the time is updated from the first graph based on the operation by the user, and wherein the second operating period images are the first operating period images, at least one of which is updated based on the change of the at least one of the operating periods, wherein the execution of the first screen display includes the process of displaying, as the GUI, both of the first graph indicating the change of the total continuous electricity consumption of the appliances with time axis, and a first chart indicating the operating periods for each of the appliances on the separate lines while sharing the time axis with the first graph, and the execution of the second screen display includes the process of displaying, as the GUI, both of the second graph indicating the simulated change of the total continuous electricity consumption of the appliances updated from the first graph with the time axis, and a second chart indicating new operating periods at least partly updated from the operating periods on the separate lines while sharing the time axis with the second graph.

* * * * *